(12) United States Patent
Inada et al.

(10) Patent No.: US 7,104,169 B2
(45) Date of Patent: *Sep. 12, 2006

(54) MACHINE TOOL AND BED STRUCTURE THEREOF

(75) Inventors: Yutaka Inada, Kariya (JP); Hiroaki Suzuki, Nagoya (JP); Hideki Iwai, Toyoake (JP); Katsuhiko Takeuchi, Anjo (JP); Tomohisa Katou, Anjo (JP)

(73) Assignee: Toyoda Koki Kabushiki Kaisha, Kariya (JP)

( * ) Notice: Subject to any disclaimer, the term of this patent is extended or adjusted under 35 U.S.C. 154(b) by 165 days.

This patent is subject to a terminal disclaimer.

(21) Appl. No.: 10/684,547

(22) Filed: Oct. 15, 2003

(65) Prior Publication Data

US 2004/0134318 A1    Jul. 15, 2004

(30) Foreign Application Priority Data

Oct. 17, 2002  (JP) .............................. 2002-302871
Oct. 23, 2002  (JP) .............................. 2002-308652

(51) Int. Cl.
*B23Q 1/00* (2006.01)

(52) U.S. Cl. .................... 82/149; 82/142; 409/235; 408/234; 248/637

(58) Field of Classification Search ................ 82/121, 82/142, 149, 158; 409/235, 238, 135; 408/234; 248/637–639
See application file for complete search history.

(56) References Cited

U.S. PATENT DOCUMENTS

| | | | | |
|---|---|---|---|---|
| 2,725,775 A | * | 12/1955 | Leifer ........................... | 82/117 |
| 3,680,263 A | * | 8/1972 | Johnson ........................ | 451/23 |
| 3,837,245 A | * | 9/1974 | Schuler et al. ................. | 82/149 |
| 4,461,121 A | * | 7/1984 | Motzer et al. .................. | 451/5 |
| 4,478,117 A | * | 10/1984 | Brown et al. .................. | 82/149 |
| 4,570,387 A | * | 2/1986 | Unno et al. .................... | 451/5 |
| 4,593,444 A | | 6/1986 | Kavthekar | |
| 4,833,764 A | * | 5/1989 | Muller .......................... | 29/40 |
| 5,072,548 A | * | 12/1991 | Girard et al. .................. | 451/21 |
| 5,323,572 A | * | 6/1994 | Guenin ......................... | 451/21 |
| 5,415,610 A | | 5/1995 | Schutz et al. .................. | 483/16 |

(Continued)

FOREIGN PATENT DOCUMENTS

DE    199 04 860    8/2000

(Continued)

OTHER PUBLICATIONS

Patent Abstracts of Japan, JP 61-111867, May 29, 1986.

(Continued)

*Primary Examiner*—Monica Carter
*Assistant Examiner*—Sara Addisu
(74) *Attorney, Agent, or Firm*—Oblon, Spivak, McClelland, Maier & Neustadt, P.C.

(57) ABSTRACT

A machine tool includes X-axis, Y-axis, and Z-axis moving units for producing relative movements between a tool and a workpiece; a C-axis drive unit for rotating the workpiece about a C-axis parallel to the Z-axis; and a B-axis turning unit for turning the tool about a B-axis parallel to the Y-axis. The tool is disposed in such a manner that a machining point of the tool coincides with the B-axis. The moving units, the drive unit, and the turning unit are controlled in such a manner that a work point of the workpiece coincides with the machining point of the tool. The bed is formed through casting and has a hollow structure and a hole as cast; and a cover is provided to cover the hole as cast in order to close the interior of the bed.

7 Claims, 24 Drawing Sheets

U.S. PATENT DOCUMENTS

| | | | |
|---|---|---|---|
| 5,868,606 A * | 2/1999 | Martin | 451/48 |
| 6,039,634 A * | 3/2000 | Bach et al. | 451/49 |
| 6,923,603 B1 * | 8/2005 | Muto | 409/135 |
| 2004/0187654 A1 * | 9/2004 | Kato et al. | 82/1.11 |
| 2005/0056125 A1 * | 3/2005 | Trumper | 82/1.11 |

FOREIGN PATENT DOCUMENTS

| | | |
|---|---|---|
| EP | 1 122 023 | 8/2001 |
| FR | 2 555 086 | 5/1985 |
| JP | 61-26453 * | 6/1986 |
| JP | 10-151534 | 6/1998 |
| JP | 10-249660 * | 9/1998 |

OTHER PUBLICATIONS

Patent Abstracts of Japan, JP 59-097823, Jun. 5, 1984.

* cited by examiner

| | CAST IRON (1m×1m×1m) | A+HOLLOW, RIB-REINFORCED STRUCTURE | GRANITE (1m×1m×1m) | B + COVERS | B0 + MINERAL OIL | B0 + WATER |
|---|---|---|---|---|---|---|
| TYPE | A | B | C | B0 | B1 | B2 |
| MATERIAL | GRAY CAST IRON | GRAY CAST IRON | GRANITE | GRAY CAST IRON | GRAY CAST IRON | GRAY CAST IRON |
| STRUCTURE | SOLID | RIB THICKNESS : 50mm, 27CHAMBERS | SOLID | RIB THICKNESS : 50mm, 27CHAMBERS | B0 + MINERAL OIL | B0 + WATER |
| VOLUME $V$ ($m^3$) | 1.00 | 0.30 | 1.00 | 0.30 | 1.00 | 1.00 |
| SURFACE AREA $S$ ($m^2$) | 6.00 | 9.27 | 6.00 | 6.00 | 6.00 | 6.00 |
| $S/V$ ($m^{-1}$) | 6.0 | 30.9 | 6.0 | 20.0 | 6.0 | 6.0 |
| WEIGHT (kg) | 7320 | 2196 | 2650 | 2196 | 2763 | 2896 |
| HEAT CAPACITY ($kJ \cdot K^{-1}$) | 3880 | 1164 | 2173 | 1164 | 2230 | 4104 |

FIG. 11

MACHINE TOOL AND BED STRUCTURE THEREOF

BACKGROUND OF THE INVENTION

1. Field of the Invention

The present invention relates to a machine tool for precision machining of a workpiece, and to a bed structure of such a precision machine tool.

2. Description of the Related Art

A conventional precision machine tool is disclosed in, for example, Japanese Patent Application Laid-Open (kokai) No. 10-151534. As shown in FIG. 1A, in the disclosed machine tool, a machining unit, which includes a tool T provided on a main spindle 204 having a horizontal rotation axis, is provided on a Z-axis unit 203 (movable along a horizontal Z-axis). The Z-axis unit 203 is supported on an X-axis unit 202 (movable along a horizontal X-axis perpendicular to the Z-axis), which is disposed on a bed 201.

A C-axis unit 207 having a horizontal C-axis is disposed in opposition to the main spindle 204. The C-axis unit 207 supports a workpiece W for rotation about a horizontal rotational axis. The C-axis unit 207 is supported on a B-axis unit 209 (rotatable about a vertical B-axis), which is supported on a Y-axis unit 210 (movable along a vertical Y-axis), which is disposed on the bed 201.

A point of the workpiece W to be machined (hereinafter referred to as a "work point") is moved or indexed to a predetermined position by means of the C-axis unit 207, the B-axis unit 209, and the Y-axis unit 210, whereas a machining point of a tip end of the tool T is moved or indexed to a predetermined position by means of the X-axis unit 202 and the Z-axis unit 203, whereby the work point of the workpiece W is machined (cut or ground) by the tool T at its machining point.

In the conventional machine tool, the position of the work point of the workpiece W, which is represented by "A" in FIG. 1A (overall front view), is separated by a "distance Lbw" from the B-axis. Therefore, if an error α is generated as shown in FIG. 1B (partial plan view) when the B-axis unit 209 is rotated by an angle θ from a position (indicated by broken lines) at which the C-axis coincides with the Z-axis, in order to index the work point, the work point deviates from its theoretical position "A(θ)" to a position "A(θ+α)." When the tool T is moved toward the position "A(θ))," which deviates from the actual position "A(θ+α)," the tool T machines the position "A(θ)," although the position to be machined at that time is "A(θ+α)." Such an error becomes remarkable as the "distance Lbw" increases. Further, in addition to the error involved in position indexing, an error stemming from a positioning deviation at the time of B-axis stoppage becomes remarkable as the "distance Lbw" increases.

Moreover, in the conventional machine tool, as shown in FIG. 1C (partial front view), the position "A" of the work point is separated by a "distance Lyw" from the Y-axis. Therefore, when a ram 217 (movable member) of the Y-axis unit is vertically moved from a position at which the position "A" of the work point coincides with the tip end of the tool T, in order to machine the work point A, vertical forces Fu and Fd stemming from machining resistance are applied to the work point A. The ram 217 is held by a nut 221 in screw-engagement with a ball screw 220. Stemming from the "distance Lyw" and the "forces Fu and Fd," a moment is generated (an unnecessary stress acts on the nut 221 in a direction not coinciding with the Y-axis), whereby the ram 217 may incline as shown on the right side in FIG. 1C. When an "error β" is generated stemming from the inclination, the work point deviates from its theoretical position "A" to a position "A(β)." When the tool T is held at a height corresponding to that of the position "A," which deviates from the actual position "A(β)," the tool T machines the position "A," although the position to be machined at that time is "A(β)." Such an error becomes remarkable as the "distance Lyw" increases.

Influence of these errors is at a level which can be ignored in machine tools which perform ordinary machining. However, in precision machine tools which perform machining with very high accuracy on the order of several hundreds to several tens of nanometers, influence of such errors is large, and such errors must be suppressed.

Incidentally, a bed used in a precision machine tool such as a grinding machine is generally formed by casting. In general, such a bed is cast to have a hollow structure in such a manner that the bed is reinforced by integrally formed ribs arranged in a grid pattern. Further, a plurality of holes as cast (hereinafter referred to as "cast holes") penetrate the side and bottom walls of the bed. The reason why the bed is cast to have a hollow, rib-reinforced structure is to reduce the weight of the bed and the influence of long-term distortion of the material. The cast holes cannot be eliminated, because they are essential for casting a bed having a hollow, rib-reinforced structure.

In some cases, instead of a cast bed, a bed formed of stone such as granite is used in a super-precision machine tool which must machine optical components or the like with very high machining accuracy. Such a bed formed of stone such as granite has characteristics such that the bed exhibits smaller long-term changes in material properties and a larger heat capacity as compared with the case of cast beds, and generally has a solid structure.

The conventional cast bed is prone to receive influence of outside air temperature, because the inner structure of the bed is exposed to the outside air through the cast holes, and the area of contact with the outside air is larger than in a case of a bed having a solid structure.

In general, when an object has a temperature difference with respect to outside air temperature, the time from exposure to outside air temperature until the object attains the same temperature as the outside air temperature decreases as the ratio of surface area S to volume V; i.e., S/V, increases. FIG. 14 shows results of calculation for obtaining temperature changes of three objects which have the same volume and the same temperature difference with respect to outside air temperature, but have different surface areas. These three objects are formed of the same material (gray cast iron), and the calculation for each object was performed for the case where the initial temperature is 25° C., and the ambient temperature is 20° C. FIG. 14 shows that a spherical object, having the smallest S/V value, takes the longest time to attain the outside air temperature, and that the time required to attain the outside air temperature decreases as the S/V value increases. In other words, influence of outside air temperature increases as the S/V value increases.

Since the conventional cast bed has a hollow, rib-reinforced structure, the bed has an S/V value greater than that of a bed having a solid structure. Therefore, the bed temperature is prone to change as the outside air temperature changes, and affects structures mounted on the bed; specifically, slide surfaces, the tool spindle, and the workplace spindle, whereby an error is produced in the positional relation between a workplace and a tool. As a result, machining accuracy fluctuates in the course of long-term machining.

The above-described problem exerts considerable influence not only on a machine tool disposed in a place, such as an ordinary plant, where the outside air temperature changes greatly, but also on a machine tool, such as a super precision machine tool, which is placed in a thermostatic room, whose interior temperature is controlled to a set temperature ±1° C., and which is required to provide very high machining accuracy.

Meanwhile, the conventional bed formed of stone such as granite has a larger heat capacity as compared with the case of cast beds, and has a smaller area of contact with the outside air, because it assumes the shape of a solid rectangular parallelepiped. Therefore, the conventional bed formed of stone such as granite has an advantage in that the temperature of the bed is unlikely to follow changes in the outside air temperature, and the bed enables machining with high accuracy. However, the granite is more expensive than a casting, and the degree of freedom in design is low, because machining of granite is difficult.

SUMMARY OF THE INVENTION

In view of the foregoing, a first object of the present invention is to provide a machine tool which has a structure for suppressing generation of errors, to thereby improve machining accuracy.

A second object of the present invention is to inexpensively provide a bed for a machine tool which realizes low thermal displacement.

In order to achieve the first object, the present invention provides a machine tool, comprising: an X-axis moving unit, a Y-axis moving unit, and a Z-axis moving unit for producing relative movements between a tool and a workpiece along the respective directions of an X-axis, a Y-axis, and a Z-axis, which differ from one another; a C-axis drive unit for rotating the workpiece about a C-axis parallel to the Z-axis; and a B-axis turning unit for turning the tool about a B-axis which is defined on the B-axis turning unit and is parallel to the Y-axis. The tool is disposed in such a manner that a machining point of the tool substantially coincides with the B-axis. The moving units, the drive unit, and the turning unit are controlled in such a manner that a work point of the workpiece substantially coincides with the machining point of the tool.

In the machine tool of the present invention, the position of the tool is determined in such a manner that the machining point of the tool substantially coincides with the B-axis. Therefore, even when an error is generated in turning movement of the B-axis turning unit, the position of the machining point can be maintained on the B-axis, whereby an error in the position of the machining point can be suppressed. This feature effectively suppress an index error during B-axis turning, along with an error stemming from a positioning deviation at the time of B-axis stoppage.

As described above, since the machine tool of the present invention has a structure which hardly generates errors, machining accuracy can be improved.

Preferably, the B-axis turning unit is disposed on the Y-axis moving unit in such a manner that the B-axis substantially coincides with a center axis of a movable member of the Y-axis moving unit, the center axis extending along the Y-axis; and the tool is disposed on the B-axis turning unit.

In this case, the machining point of the tool can be located on the center axis of the movable member of the Y-axis moving unit. Therefore, when machining is performed while the Y-axis moving unit is driven to move the movable member along the Y-axis direction, unnecessary stresses acting on drive means or the like can be suppressed, whereby errors caused by inclination of the Y-axis moving unit and the B-axis turning unit can be suppressed. Moreover, since the B-axis turning unit carrying the tool is disposed on the Y-axis moving unit whose error is suppressed, error in the position of the machining point of the tool can be suppressed further.

Preferably, the C-axis drive is disposed on the Z-axis moving unit in such a manner that the C-axis substantially coincides with a center axis of a movable member of the Z-axis moving unit, the center axis extending along the Z-axis.

In this case, the work point of the workpiece can be located in the vicinity of the center axis of the movable member of the Z-axis moving unit. Therefore, when the workpiece held by the C-axis drive unit is machined, while the workpiece is moved along the Z-axis direction by means of the Z-axis moving unit in order to be pressed against the tool, unnecessary stresses which act, for example, on drive means for Z-axis drive due to influence of the reaction of the pressing operation can be suppressed, whereby errors caused by inclination of the Z-axis moving unit and the C-axis turning unit can be suppressed.

Preferably, the machine tool has a bed having a horizontal top surface and a vertical side surface, wherein the X-axis moving unit is disposed on the horizontal top surface of the bed, the Z-axis moving unit is disposed on the X-axis moving unit, and the C-axis drive unit is disposed on the Z-axis moving unit, and wherein the Y-axis moving unit is disposed on the vertical side surface of the bed in such a manner that the Z-axis-direction center axis of the movable member of the Z-axis moving unit perpendicularly intersects the Y-axis-direction center axis of the movable member of the Y-axis moving unit, the B-axis turning unit is disposed on the Y-axis moving unit, and the tool is disposed on the B-axis turning unit.

In this case, a bed having a complicated shape is not required, and a bed having a substantially rectangular parallelepiped shape can be used. Therefore, the accuracy of the bed can be easily improved, and thus the individual moving units, turning unit, etc. can be mounted on the bed with improved positional accuracy.

In order to achieve the second object, the present invention provides a bed structure for a machine tool, comprising: a bed formed through casting, the bed having a hollow structure and a hole as cast; and a cover for covering the hole as cast in order to close the interior of the bed.

This structure decreases the area of a surface exposed to the outside air, to thereby suppress total thermal displacement of the bed.

Preferably, a liquid is charged into the interior of the bed. In this case, since the heat capacity of the bed increases, thermal displacement can be suppressed to a greater degree as compared to the case where the hole as cast is merely closed. Preferably, the liquid is oil, or water containing a rust preventing agent.

BRIEF DESCRIPTION OF THE DRAWINGS

Various other objects, features and many of the attendant advantages of the present invention will be readily appreciated as the same becomes better understood by reference to the following detailed description of the preferred embodiments when considered in connection with the accompanying drawings, in which:

FIG. 11 is a table showing volumes V, surface areas S, ratios S/V, weights, and total heat capacities of modeled conventional bed structures and molded bed structures of the present invention;

DESCRIPTION OF THE PREFERRED EMBODIMENTS

A machine tool according to a first embodiment of the present invention will now be described with reference to the drawings.

<Overall Structure>

Figure 2A:
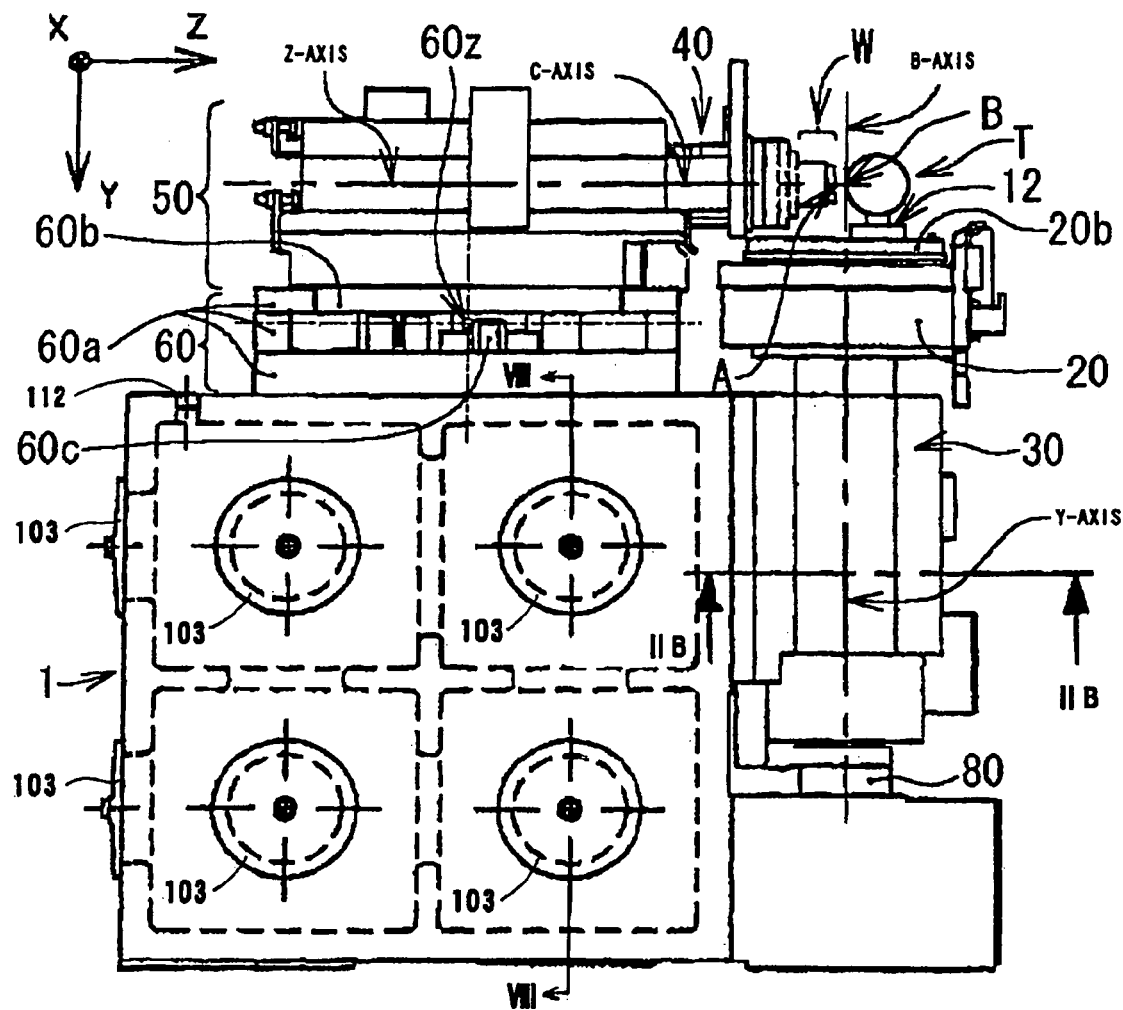
FIG. 2A is a side view of a machine tool according a first embodiment of the present invention.
Figure 2B:
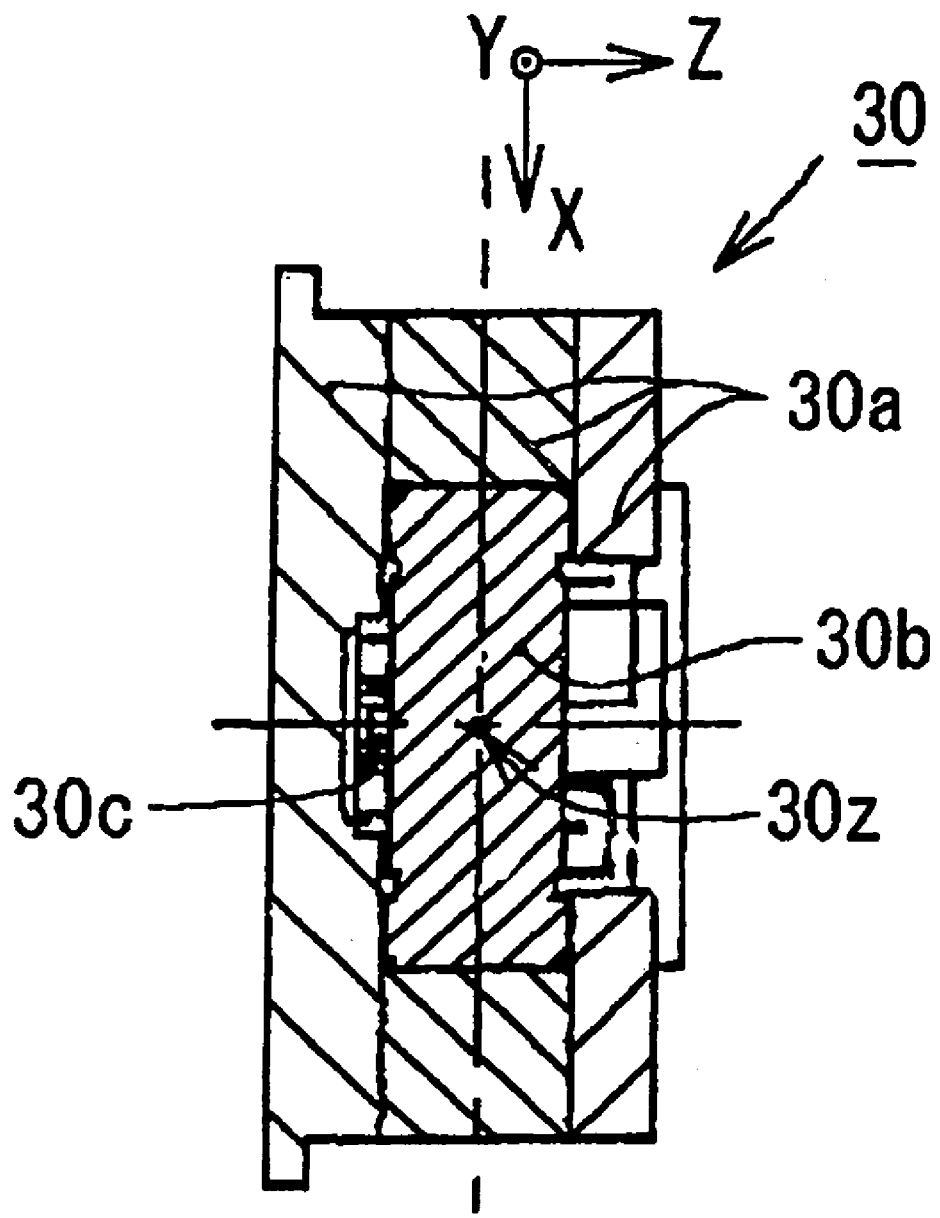
FIG. 2B is a cross-sectional view of the machine tool taken along line IIB—IIB in FIG. 2A.
Figure 2C:
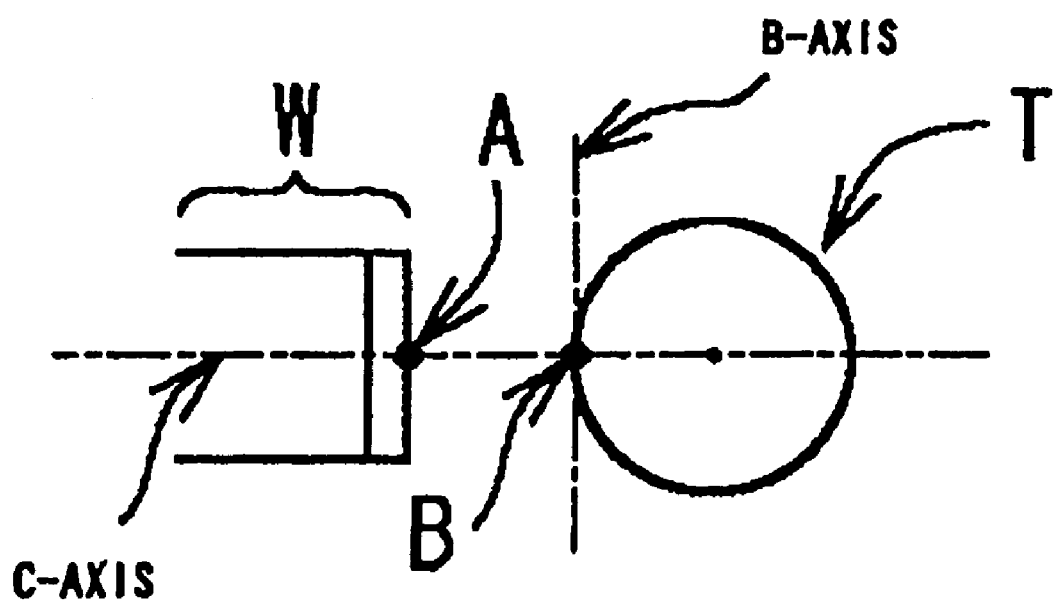
FIG. 2C is an enlarged side view showing the positional relation between a workpiece and a tool.
Figure 3A:
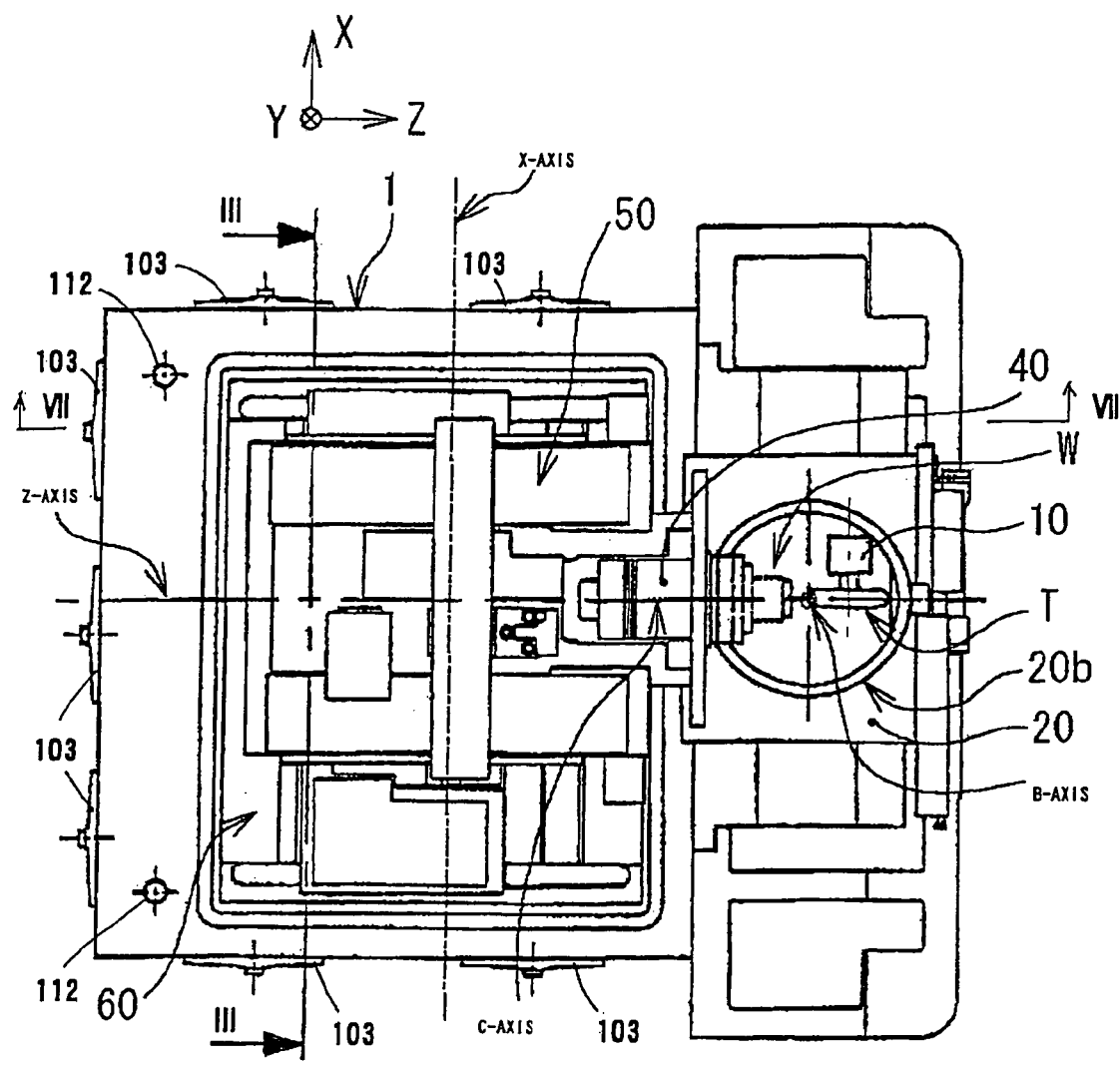
FIG. 3A is a plan view of the machine tool.
Figure 3B:
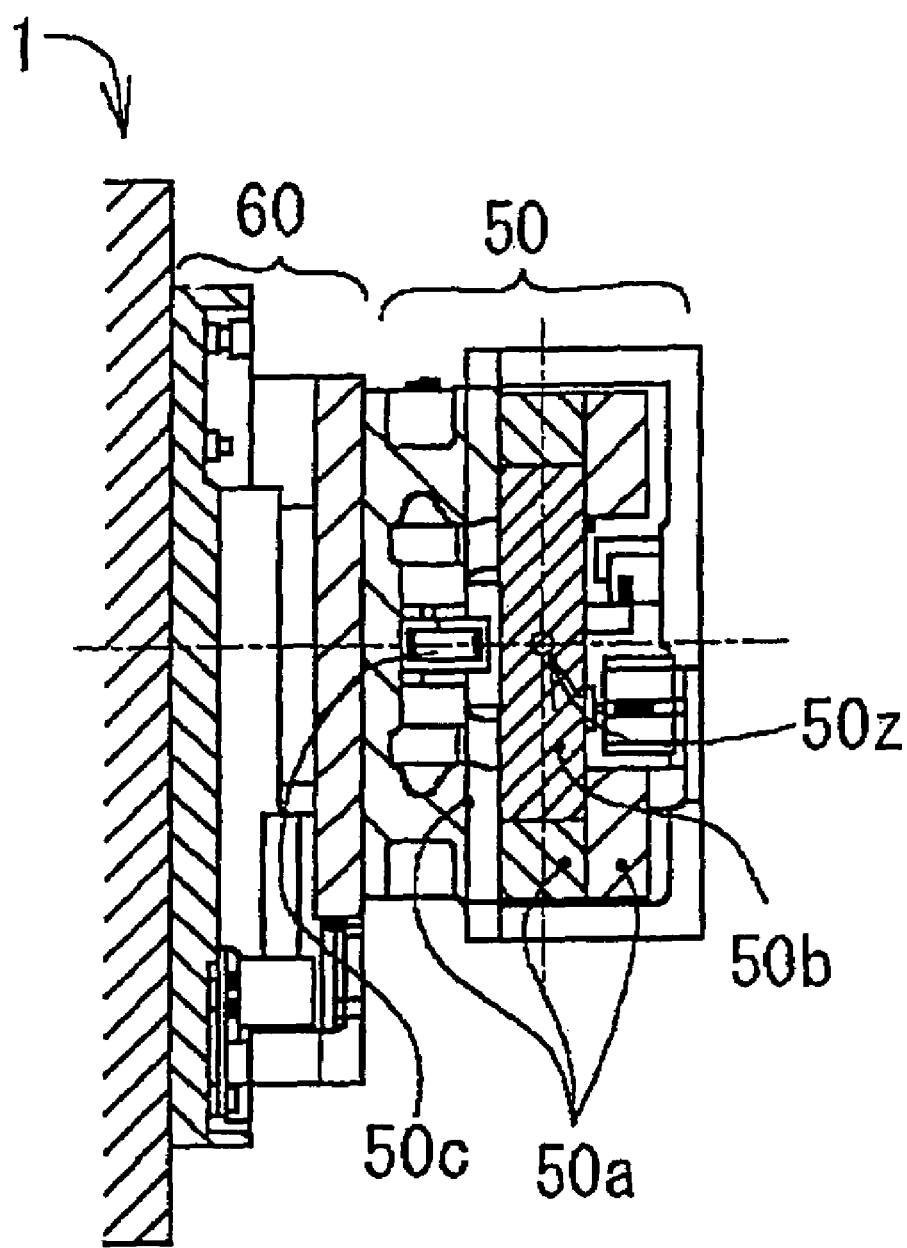
FIG. 3B is a cross-sectional view of the machine tool taken along line IIIB—IIIB in FIG. 3A.
Figure 3C:
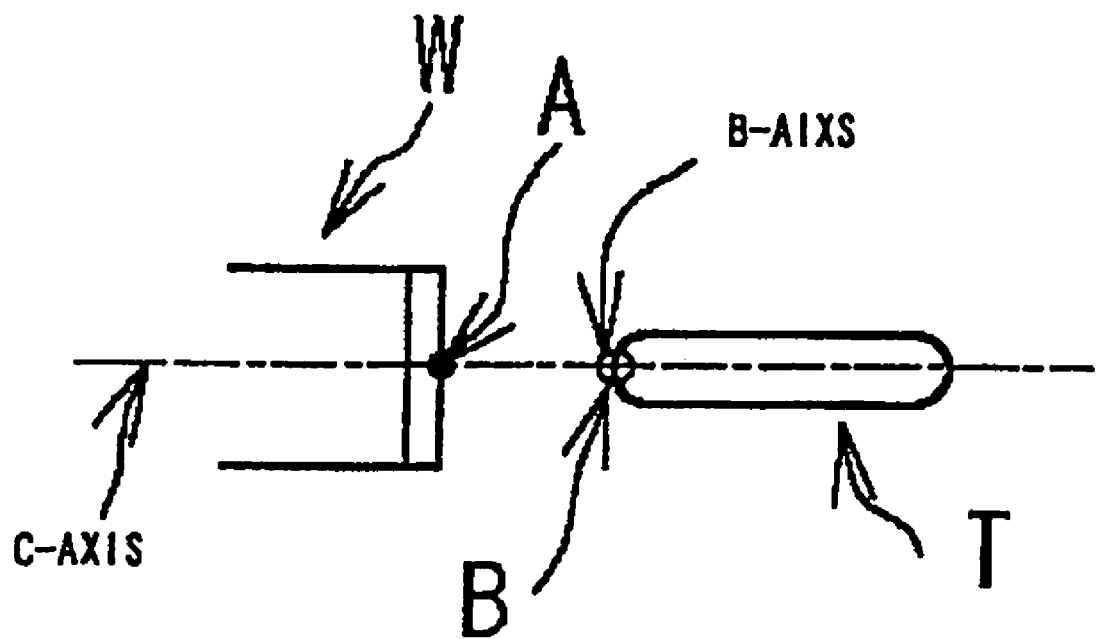
FIG. 3C is an enlarged plan view showing the positional relation between the workpiece and the tool.

The arrangement of individual moving units, a turning unit, etc. of the machine tool will be described with reference to FIGS. 2A to 2C, FIGS. 3A to 3C, and FIG. 4; and the positional relation among the center axes of movable members of the individual moving units, the turning unit, etc. will be described with reference to FIGS. 2A to 2C and FIGS. 3A to 3C. FIG. 2A shows a left-hand side view of the machine tool; FIG. 2B is a cross-sectional view of the machine tool taken along line IIB—IIB in FIG. 2A (a cross-sectional view of a Y-axis moving unit 30); and FIG. 2C is an enlarged side view showing the positional relation between a work point A of a workplace W and a machining point B of a tool T shown in FIG. 2A. FIG. 3A shows a plan view of the machine tool; FIG. 3B is a cross-sectional view of the machine tool taken along line IIIB—IIIB in FIG. 3A (a cross-sectional view of a Z-axis moving unit 50); and FIG. 3C is an enlarged side view showing the positional relation between the work point A of the workpiece W and the machining point B of the tool T shown in FIG. 3A.

The machine tool according to the present embodiment is a super precision machine tool adapted to machine a workpiece, such as a lens or a lens mold, having an axisymmetric shape or a free curved surface with an accuracy of several hundreds to several tens of nanometers.

Figure 5A:
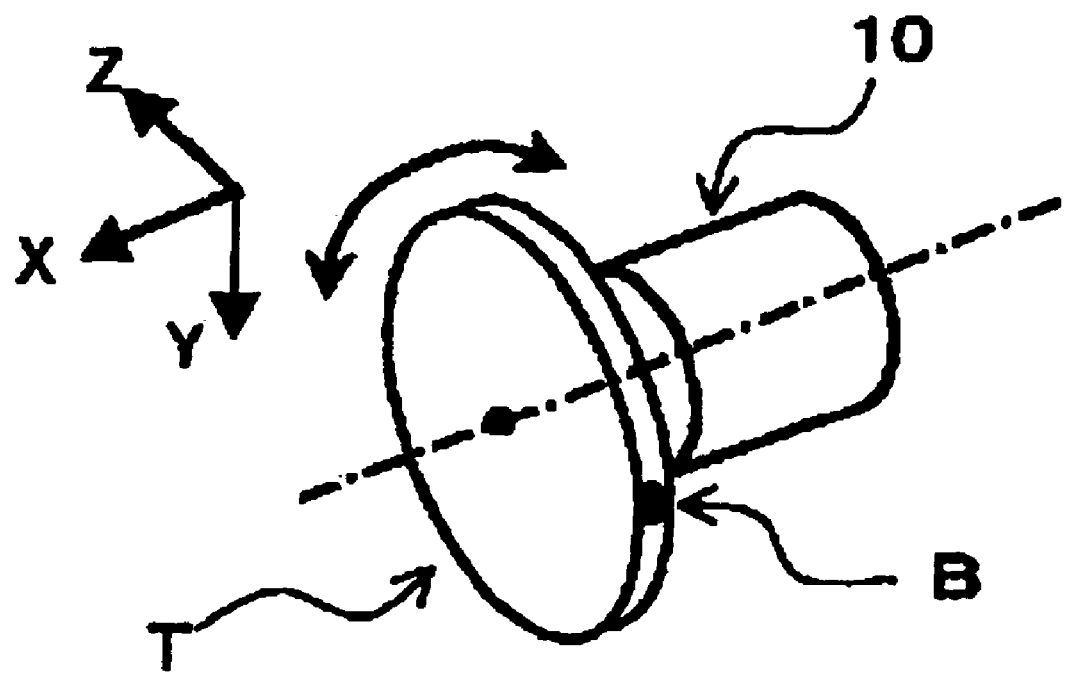
FIGS. 5A to 5C are explanatory views showing suppression of errors.
Figure 6A:
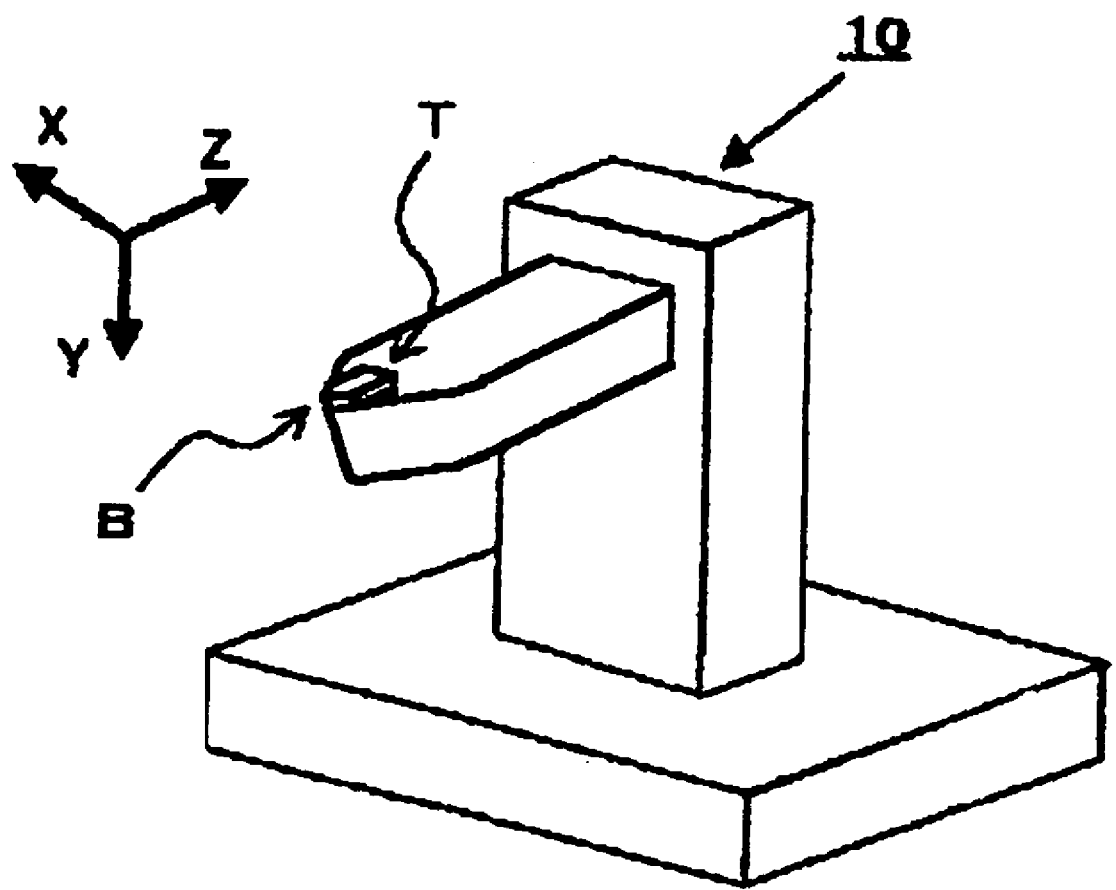
FIGS. 6A to 6C are explanatory views showing suppression of errors.

Various tools may be used as the tool T. For example, as shown in FIG. 5A, a grinding wheel supported and rotated by a drive unit 10 may be used. Alternatively, as shown in FIG. 6A, a cutting tool (turning tool) may be used. In the example shown in FIGS. 2A to 4, the grinding wheel shown in FIG. 5A is used as the tool T. In this case, the machining point B of the tool T is located on a circumferential surface of the tool T, and the machining point B of the tool T is brought into contact with the work point A of the workpiece W to thereby grind the workpiece W. Notably, the position of the work point A may be changed on the workpiece W.

The machine tool has a bed 1, which generally assumes the shape of a rectangular parallelepiped. The bed 1 has a horizontal top surface (extending along the X-axis and Z-axis directions in FIGS. 2A and 3A), and vertical side surfaces (extending along the Y-axis direction in FIGS. 2A and 3A). Since the bed 1 has a rectangular parallelepiped shape, which is very simple, each surface can easily be machined to have high accuracy (in terms of the horizontalness of the horizontal surface, and the verticalness of the vertical surfaces). Individual parts, etc., which affect machining accuracy, can be accurately disposed on the corresponding surfaces, and position-adjusted thereon. Thus, the machining accuracy can be improved further.

An X-axis moving unit 60 is disposed on the top surface of the bed 1 in order to produce relative movement between the work point A of the workpiece W and the machining point B of the tool T along a horizontal direction (along the X-axis direction in FIGS. 2A to 4). As shown in FIG. 2A, the X-axis moving unit 60 includes a guide mechanism (stationary member) 60*a*, a movable member 60*b*, and a linear motor 60*c*. The movable member 60*b* is in slidable engagement with the guide mechanism 60*a*, and is reciprocated along the X-axis direction by means of the linear motor 60*c*.

In order to minimize position errors involved in linear motion, the linear motor 60*c* is used as drive means of the X-axis moving unit 60, instead of a motor of a rotary motion type. Therefore, a mechanism for converting rotary motion to linear motion becomes unnecessary, the movable member can be moved directly along a straight path, and backlash is hardly generated, whereby errors can be reduced further.

The center axis of the movable member 60*b* of the X-axis moving unit 60, which axis extends along the X-axis direction, is referred to as the X-axis center axis 60*z* (see FIG. 2A).

The above-mentioned Z-axis moving unit 50 is disposed on the top surface of the X-axis moving unit 60 in order to produce a relative movement between the work point A of the workpiece W and the machining point B of the tool T along a horizontal direction perpendicular to the X-axis (along the Z-axis direction in FIGS. 2A to 4). As shown In FIG. 3B, the Z-axis moving unit 50 includes a guide mechanism (stationary member) 50*a*, a movable member 50*b*, and a linear motor 50*c*. The movable member 50*b* is in slidable engagement with the guide mechanism 50a, and is reciprocated along the Z-axis direction by means of the linear motor 50c.

For the same reason as mentioned in connection with the X-axis moving unit 60, the linear motor 50c is used as drive means of the Z-axis moving unit 50. The center axis of the movable member 50b of the Z-axis moving unit 50, which axis extends along the Z-axis direction, is referred to as the Z-axis center axis 50z (see FIG. 3B).

Notably, the distance between the X-axis center axis 60z and the Z-axis center axis 50z is preferably reduced to a possible extent so as to reduce errors.

A C-axis drive unit 40 is disposed at the point of intersection between the Z-axis center axis 50z and a front end face of the movable member 50b of the Z-axis moving unit 50. The C-axis drive unit 40 supports the workpiece W and rotates the same about a C-axis drive axis (C-axis; i.e., a horizontal direction which coincides with the Z-axis direction in FIGS. 2A and 3A), in order to produce a relative turn (rotation) between the work point A of the workpiece W and the machining point B of the tool T about the C-axis (in this case, the Z-axis).

The above-described Y-axis moving unit 30 is disposed on a side surface of the bed 1 in order to produce relative movement between the work point A of the workpiece W and the machining point B of the tool T along the vertical direction (along the Y-axis direction in FIGS. 2A to 4). As shown in FIG. 2B, the Y-axis moving unit 30 includes a guide mechanism (stationary member) 30a, a movable member 30b, and a linear motor 30c. The movable member 30b is in slidable engagement with the guide mechanism 30a, and is reciprocated along the Y-axis direction by means of the linear motor 30c.

For the same reason as mentioned in connection with the X-axis moving unit 60, the linear motor 30c is used as drive means of the Y-axis moving unit 30. The center axis of the movable member 30b of the Y-axis moving unit 30, which axis extends along the Y-axis direction, is referred to as the Y-axis center axis 30z (see FIG. 2B).

Notably, a balance cylinder 80 is disposed under the Y-axis moving unit 30 in order to support the movable member 30b, on which is mounted a B-axis turning unit 20 carrying the tool T, with a force substantially equal to the force of gravity. This configuration reduces the load acting on the linear motor of the Y-axis moving unit 30, so as to further reduce errors. Notably, the center axis of the balance cylinder 80 extending along the Y-axis direction is adjusted to coincide with the Y-axis center axis 30z of the movable member 30b, to thereby prevent application of off-axis forces.

The above-mentioned B-axis turning unit 20 is disposed on the top surface of the Y-axis moving unit 30 in order to produce a relative turn between the work point A of the workpiece W and the machining point B of the tool T about a B-axis turning axis (B-axis); i.e., a vertical direction which coincides with the Y-axis direction in FIG. 2A). As shown in FIG. 3A, a B-axis turntable 20b is provided on the B-axis turning unit 20, and is turned about the B-axis. The tool T is fixedly disposed on the B-axis turntable 20b, whereby the direction of the machining point B of the tool T (orientation of the tool T within a horizontal plane) can be changed or indexed.

The tool T is disposed on the B-axis turntable 20b of the B-axis turning unit 20 in such a manner that the machining point B of the tool T on the circumferential surface thereof coincides with the B-axis turning axis (B-axis). Therefore, irrespective of angular position of the B-axis turntable 20b, the machining point B of the tool T remains on the B-axis turning axis (B-axis) with substantially no deviation therefrom. Notably, the orientation of the tool T at the machining point B changes in accordance with the turn angle of the B-axis turntable 20b.

The B-axis turning unit 20 is disposed on the top surface of the Y-axis moving unit 30 in such a manner that the Y-axis center axis 30z coincides with the B-axis turning axis (B-axis). Further, the C-axis drive unit 40 is disposed at the front end portion of the Z-axis moving unit 50 in such a manner that the Z-axis center axis 50z coincides with the C-axis drive axis (C-axis).

Figure 4:
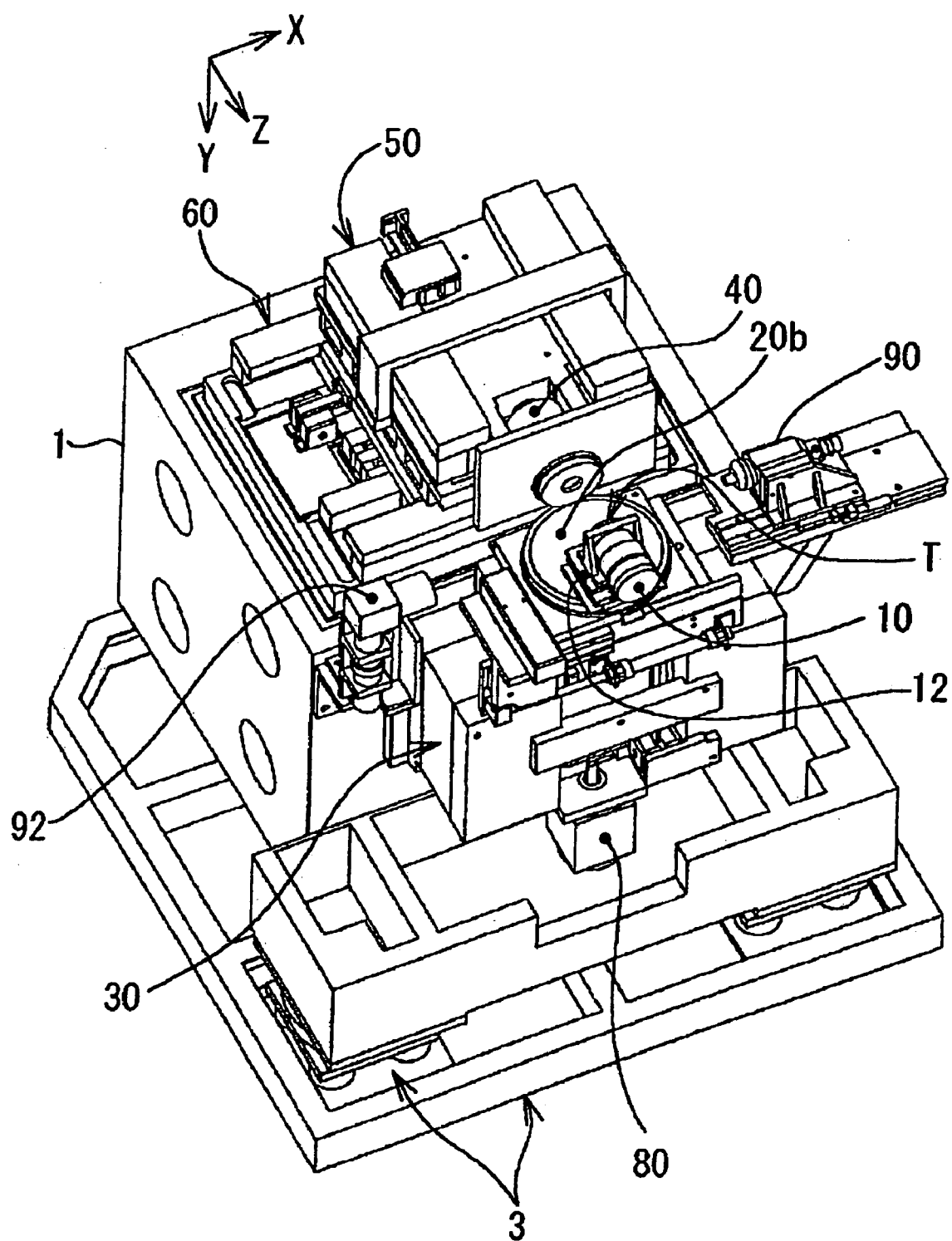
FIG. 4 is a perspective view of the machine tool.

Notably, as shown in FIG. 4, the machine tool is equipped with a microscope 90 for initial positioning of the work point A and the machining point B, and a stroboscope 92 for assisting the position checking by the microscope 90. Moreover, a fine adjustment mechanism 12 is provided between the tool T and the B-axis turntable 20b (table turned by the B-axis turning unit 20) in order to attain a perfect match between the machining point B of the tool T and the B-axis. A machine operator operates the fine adjustment mechanism 12, while viewing the machining point B of the tool T by use of the microscope 90, in such a manner that the machining point B of the tool T coincides with the B-axis (in the example shown in FIG. 4, the operator finely adjusts the position of the drive unit 10, which supports and drives the tool T).

Moreover, in FIG. 4, there is shown a shock-absorbing base 3, which precisely maintains the bed 1 in a horizontal posture with respect to the floor surface, and absorbs vibrations from the floor surface or the like.

<Suppression of Error in Turn Angle of B-axis Turning Unit (FIGS. 5A to 5C)>

Next, the reason why error in turn angle of the B-axis turning unit 20 is suppressed will be described with reference to FIGS. 5A to 5C. In the conventional machine tool shown in FIG. 1B, because of the "distance Lbw" between the B-axis turning axis (B-axis) and the work point A of the workplace W, an error in turn angle (error angle $\alpha$) may affect the position of the work point A. The error is at a level which can be ignored in a machine tool which performs ordinary machining. However, in a precision machine tool which performs machining with very high accuracy on the order of several hundreds to several tens of nanometers, influence of such error is large, and such error must be suppressed.

Such a positional error can be reduced by reducing the "distance Lbw" to a value near zero. However, since the work point A of the workpiece W Is set at different positions on the workpiece W, reducing the distance Lbw to a value near zero is considerably difficult (even when the distance between the B-axis and a certain work point is reduced to zero, the distance between the B-axis and another work point does not become zero). In view of the foregoing, in the present embodiment, instead of the work point A of the workpiece W, the machining point B of the tool T is turned by means of the B-axis turning unit 20 (because the machining point B of the tool T maintains a constant position).

Figure 5B:
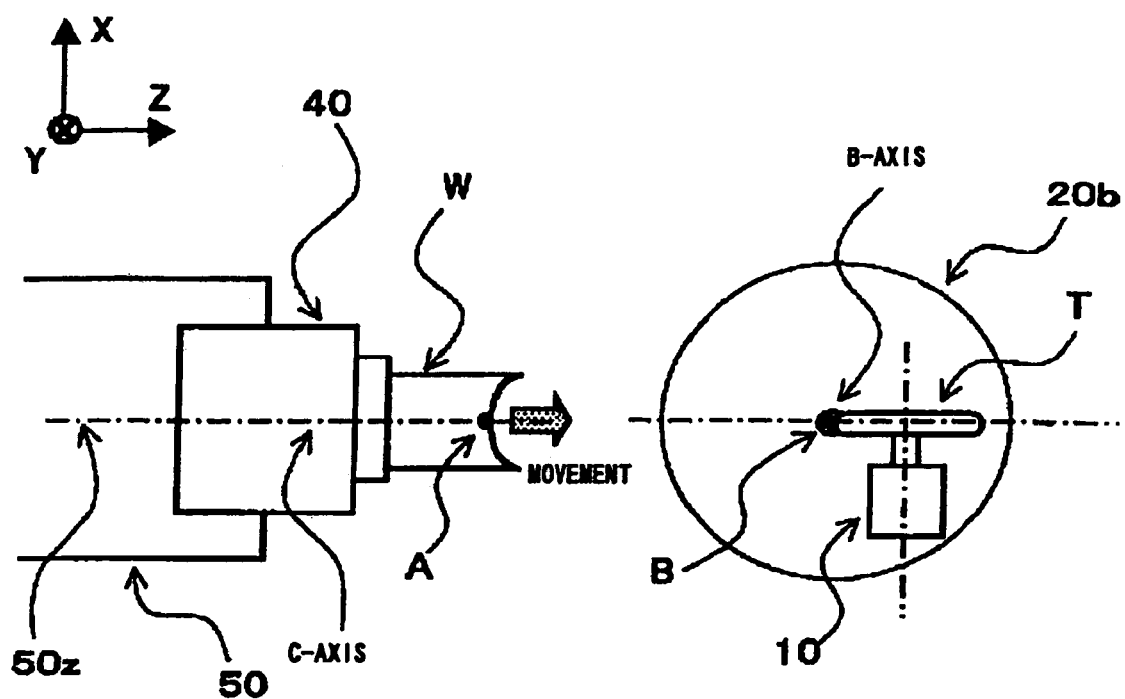
Figure 5C:
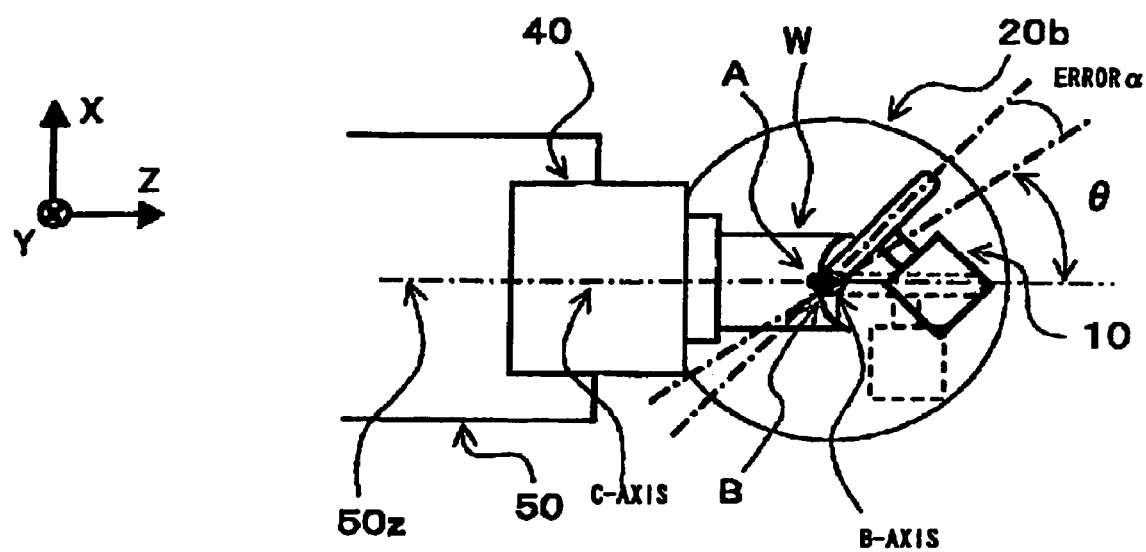

In order to reduce the distance between the B-axis turning axis and the machining point B of the tool T to a value near zero, the tool T is disposed as shown in FIG. 5B, whereby the machining point B of the tool T coincides with the B-axis turning axis. Therefore, even when an "error angle $\alpha$" is produced as shown in FIG. 5C when the B-axis turning unit 20 is rotated by an angle $\theta$ from a position (indicated by broken lines) at which the C-axis is parallel to the tool T, an error is hardly generated in the position "B" of the work point. As described above, the machine tool according to the present invention can effectively suppress an index error during B-axis turning, along with an error stemming from a positioning deviation at the time of B-axis stoppage.

Figure 1A:
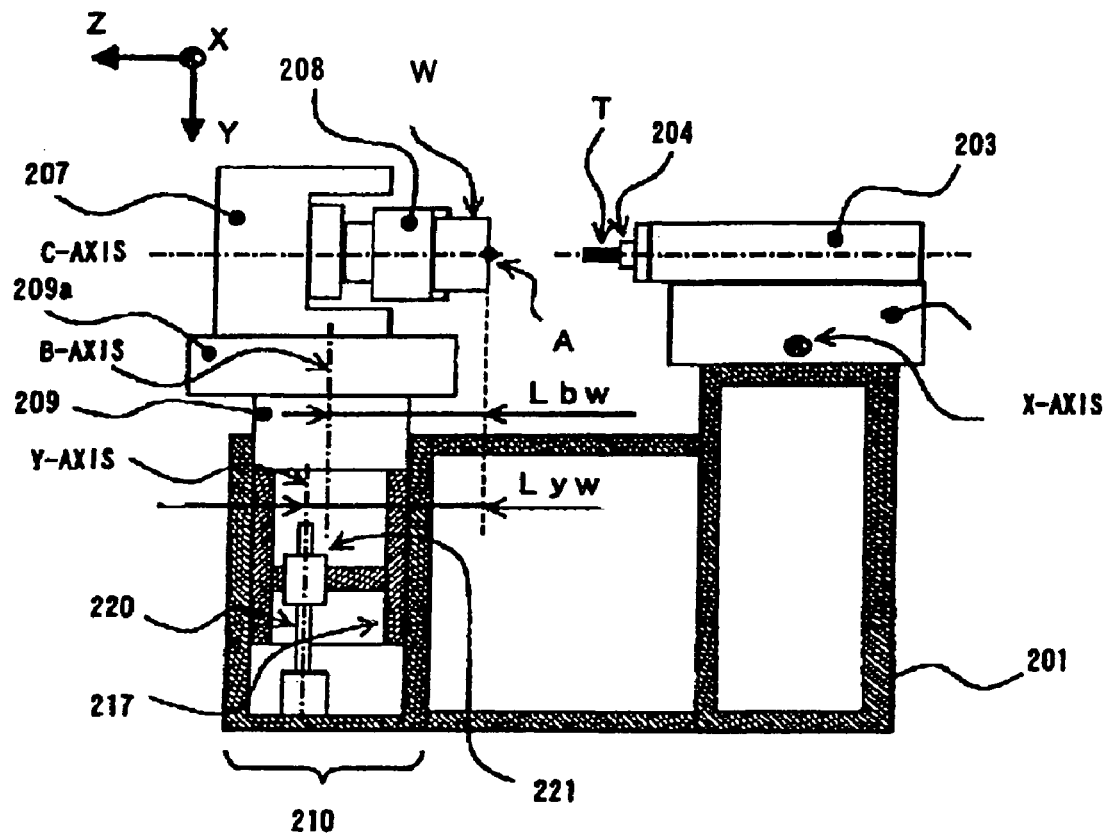
FIGS. 1A to 1C are views showing a conventional machine tool.
Figure 1B:
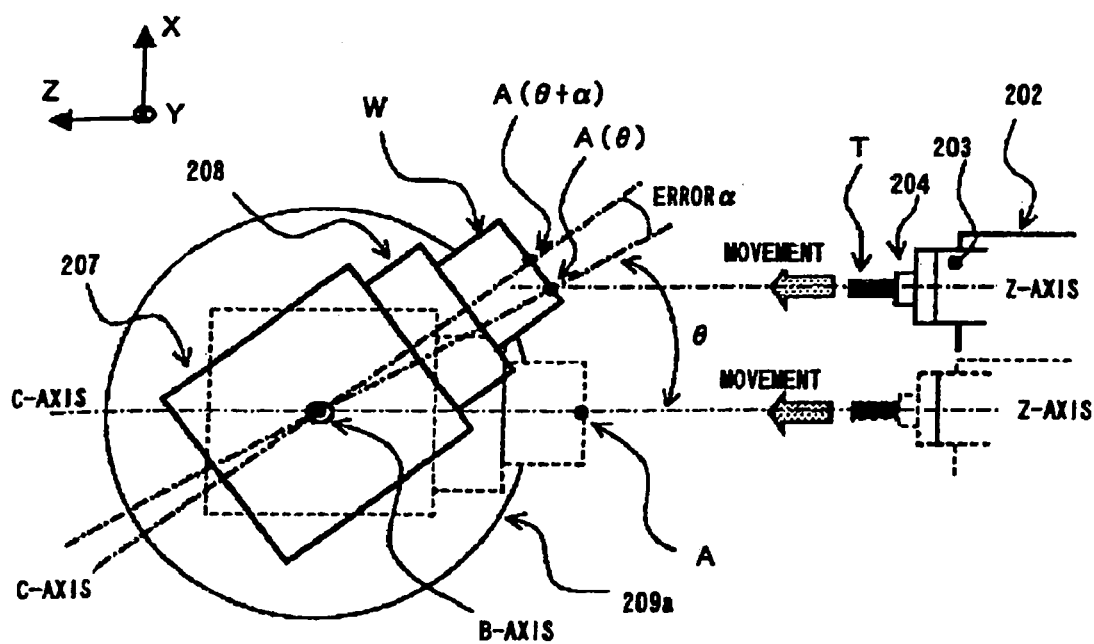
Figure 1C:
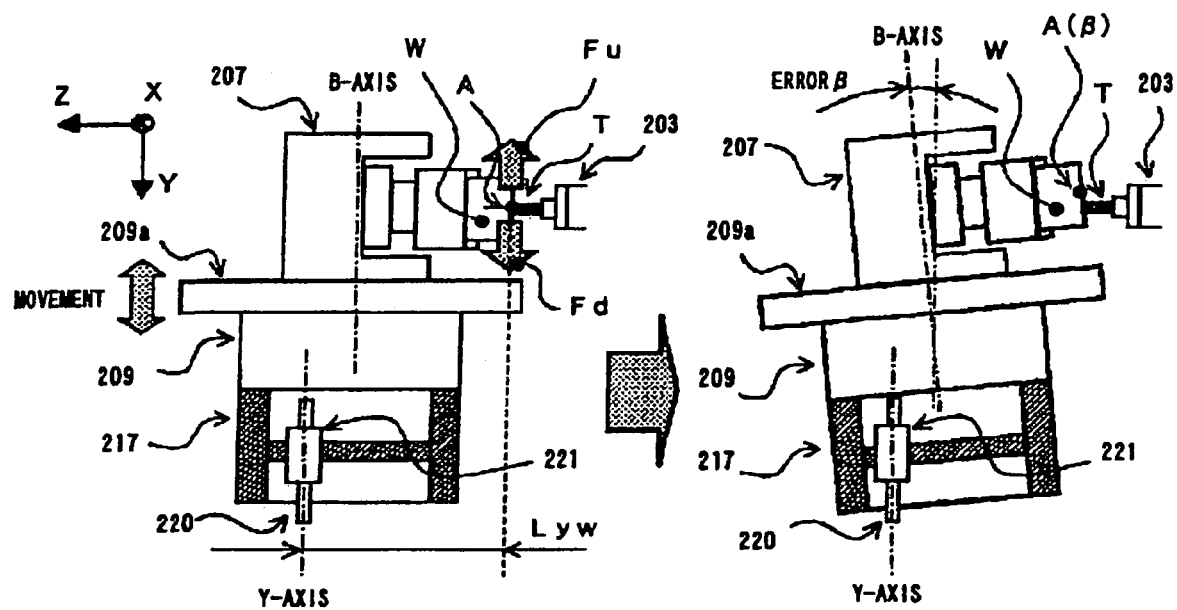

In the conventional machine tool shown in FIGS. 1A to 1C, since the C-axis unit 207 is mounted on the B-axis unit 209, the B-axis unit 209 is large and heavy. In contrast, in the present embodiment, only the tool T and the drive unit 10 are mounted on the B-axis turning unit 20, so that the B-axis turning unit 20 can be reduced in size and weight.

<Suppression of Stress Generated Between Work Point of Workpiece and Y-axis Center Axis (FIGS. 6A to 6C)>

Figure 6B:
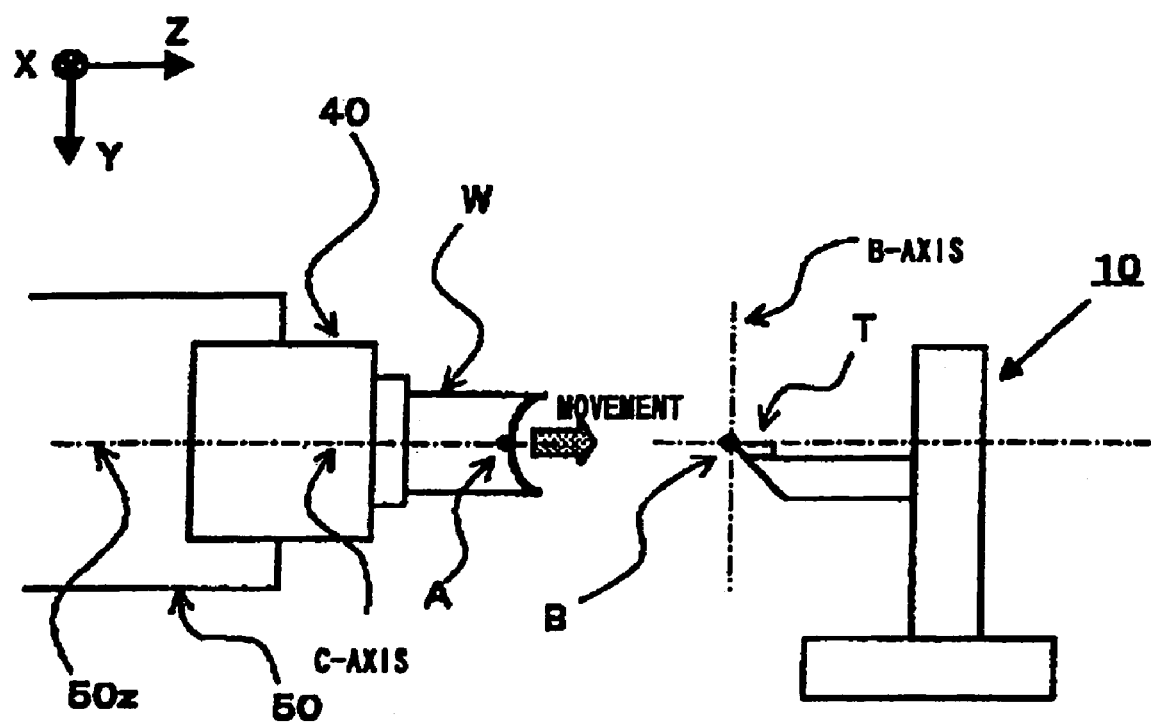
Figure 6C:
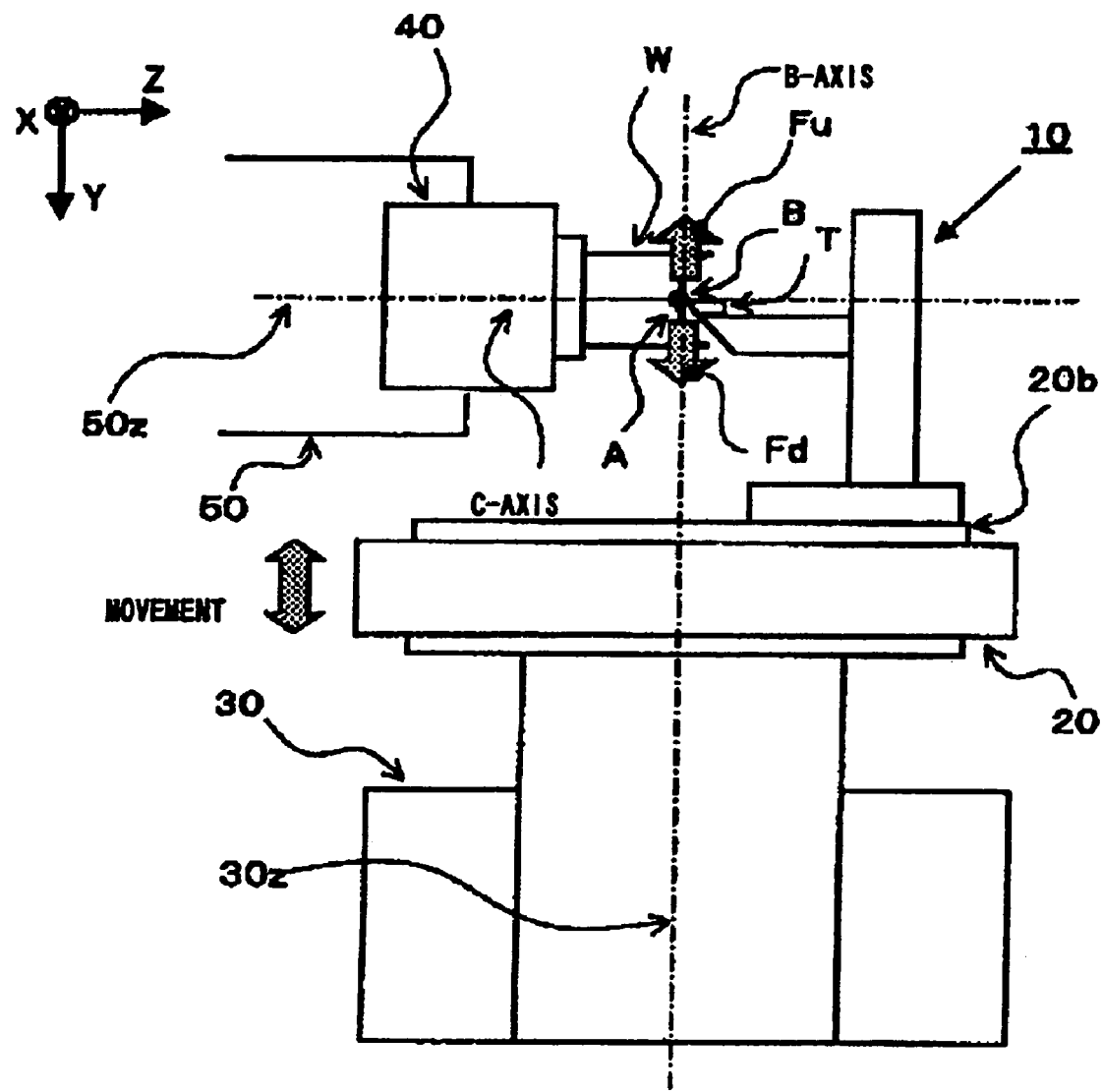

Next, the reason why stress generated between the work point A of the workpiece W and the Y-axis center axis 30z is suppressed will be described with reference to FIGS. 6A to 6C. Notably, in FIGS. 6A to 6C, the fine adjustment mechanism 12 shown in FIG. 4 is omitted.

In the conventional machine tool shown in FIG. 1C, because of the "distance Lyw" between the work point A of the workpiece W and the Y-axis drive axis, an unnecessary stress is generated, and an "error angle β" may affect the position of the work point A. The error is at a level which can be ignored in a machine tool which performs ordinary machining. However, in a precision machine tool which performs machining with very high accuracy on the order of several hundreds to several tens of nanometers, influence of such error is large, and such error must be suppressed.

Such an unnecessary stress can be suppressed by reducing the "distance Lyw" to a value near zero. In view of this, in the present embodiment, the B-axis turning axis (i.e., the machining point B of the tool T) is made coincident with the Y-axis center axis 30z in order to make the work point A of the workpiece W coincident with the Y-axis center axis 30z (reduce the distance therebetween to substantially zero), whereby generation of the error angle β as shown in FIG. 1C is suppressed.

<Suppression of Stress Generated Between C-axis Drive Axis and Z-axis Center Axis>

Next, the reason why stress generated between the C-axis drive axis and the Z-axis center axis 50z is suppressed will be described. In the case where the C-axis drive axis and the Z-axis center axis 50z are separated from each other, when the work point A of the workpiece W is moved along the Z-axis direction by means of the Z-axis moving unit 50 so as to press the work point A to the machining point B of the tool T, a stress is generated in the direction (in the example of FIG. 5B, the left direction along the Z-axis) opposite the pressing direction (in the example of FIG. 5B, the right direction along the Z-axis). In order to suppress influence of the stress, the C-axis drive axis is made coincident with the Z-axis center axis 50z. Even in a case where the work point A of the workpiece W is not located on the C-axis drive axis, the distance between the work point A and the C-axis drive axis can be reduced (on average) to a possible extent, whereby generation of errors stemming from unnecessary stress can be suppressed.

As described above, the machine tool of the present invention is configured in such a manner that the X-axis center axis 60z, the Z-axis center axis 50z, the C-axis drive axis (C-axis), the Y-axis center axis 30z, the B-axis turning axis (B-axis), and the machining point B of the tool T are located at proper positions, whereby generation of errors is suppressed and machining accuracy is improved.

The machine tool of the present invention is not limited to the details, such as structure and shape, described in the embodiment, and can be subjected to modification, addition, and deletion without departing from the scope of the invention.

The type of the tool T and the machining direction of the tool T are not limited to those described in the embodiment. For example, the tool T shown in FIGS. 6A to 6C and having a horizontally directed cutting edge (machining portion) may be replaced with a tool T having a vertically directed cutting edge (machining portion).

Further, although in the embodiment the X-axis, Y-axis, and Z-axis are orthogonal coordinates, the X-axis, Y-axis, and Z-axis are not necessarily required to intersect perpendicularly.

<Structure of Bed>

Next, the structure of the bed 1 will be described in detail with reference to FIGS. 7 to 10.

Figure 7:
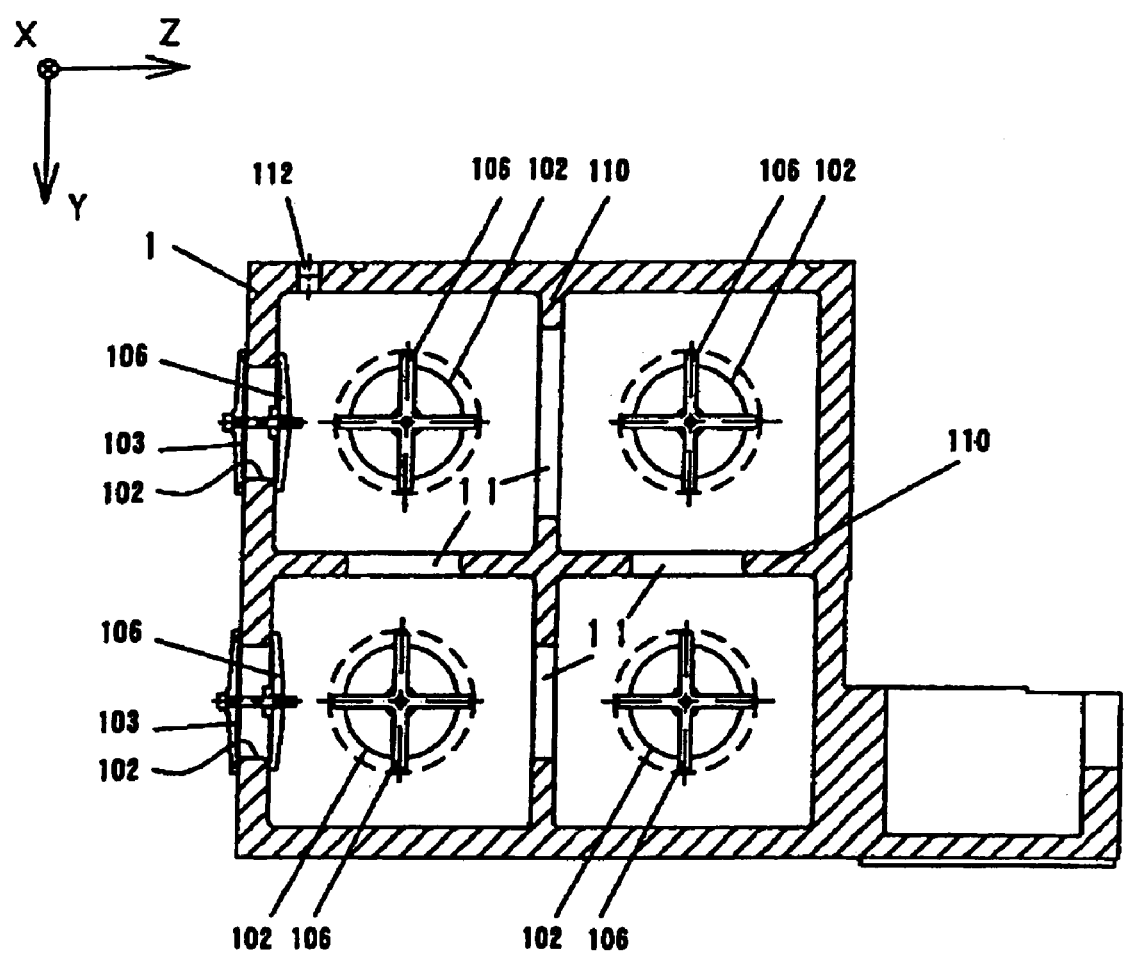
FIG. 7 is a cross sectional view of the bed taken along line VII—VII in FIG. 3A.
Figure 8:
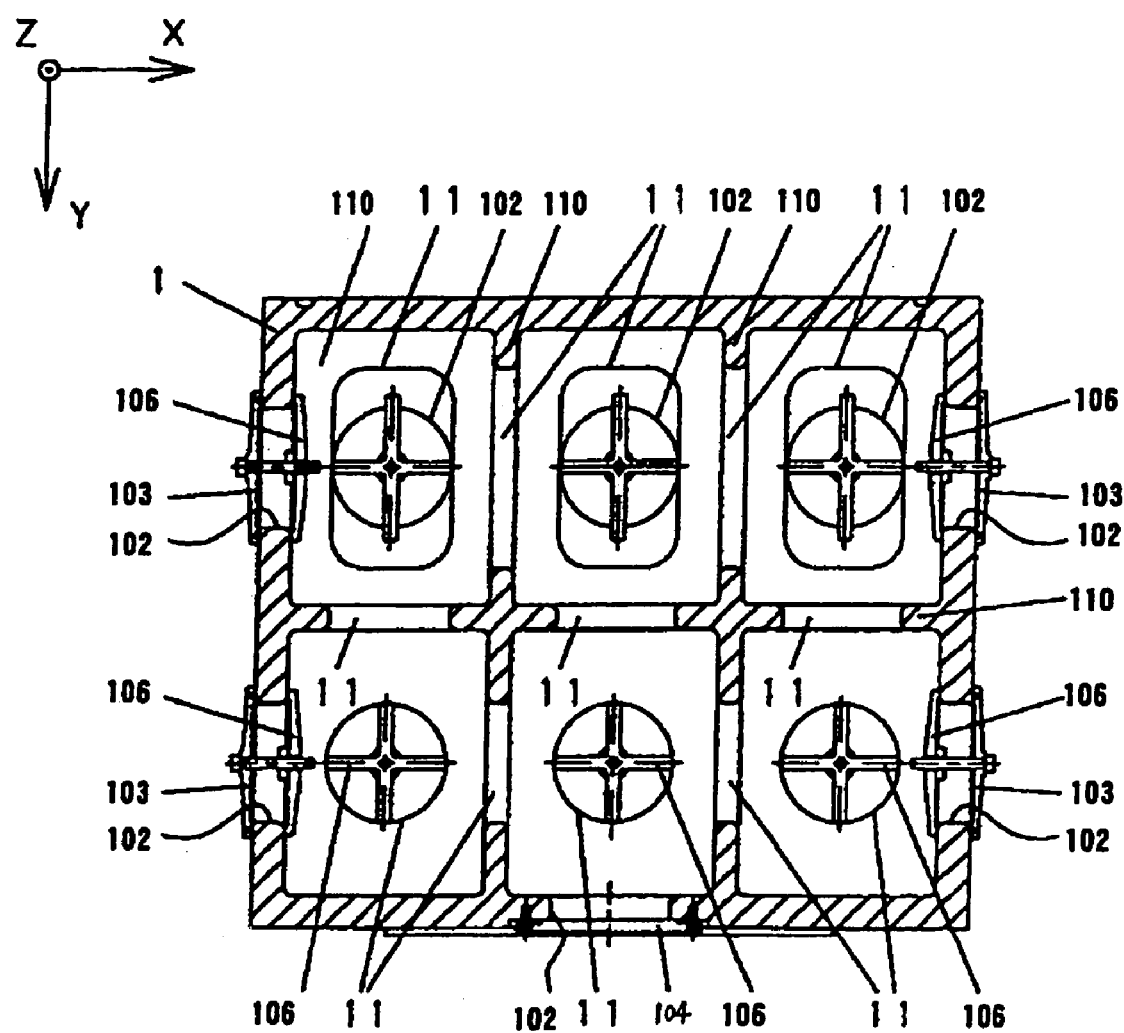
FIG. 8 is a cross sectional view of the bed taken along line VIII—VIII in FIG. 2A.

The bed 1 is formed through casting of iron, and as shown in FIGS. 7 and 8, has a hollow, rib-reinforced inner structure. Specifically, ribs 10 are integrally formed in the interior of the bed 1 in such a manner that the ribs 10 are arranged in a grid pattern in order to reinforce the bed 1 and divide the Interior of the bed 1 into twelve chambers which have the same volume and are arranged in a matrix of 2 (longitudinal direction)×3 (transverse direction)×2 (height direction). A through hole 11 is formed in each of the ribs 10 in order to connect adjacent chambers.

Cast holes 102 are formed in the bottom wall of the bed 1 and in the side walls of the bed 1, except for the side wall to which the Y-axis moving unit 30 is attached. Therefore, no cast hole is formed in the top wall of the bed 1. The cast hole 102 is provided in order to remove casting sand from the individual chambers of the bed 1 after casting. In order to facilitate the removal of casting sand, each chamber is provided with at least one cast hole 102. The cast holes 102 formed in the side walls of the bed 1 are closed by means of covers 103, and the cast holes 102 formed in the bottom wall of the bed 1 are closed by means of covers 104, whereby the interior of the bed 1 is completely closed.

Figure 9:
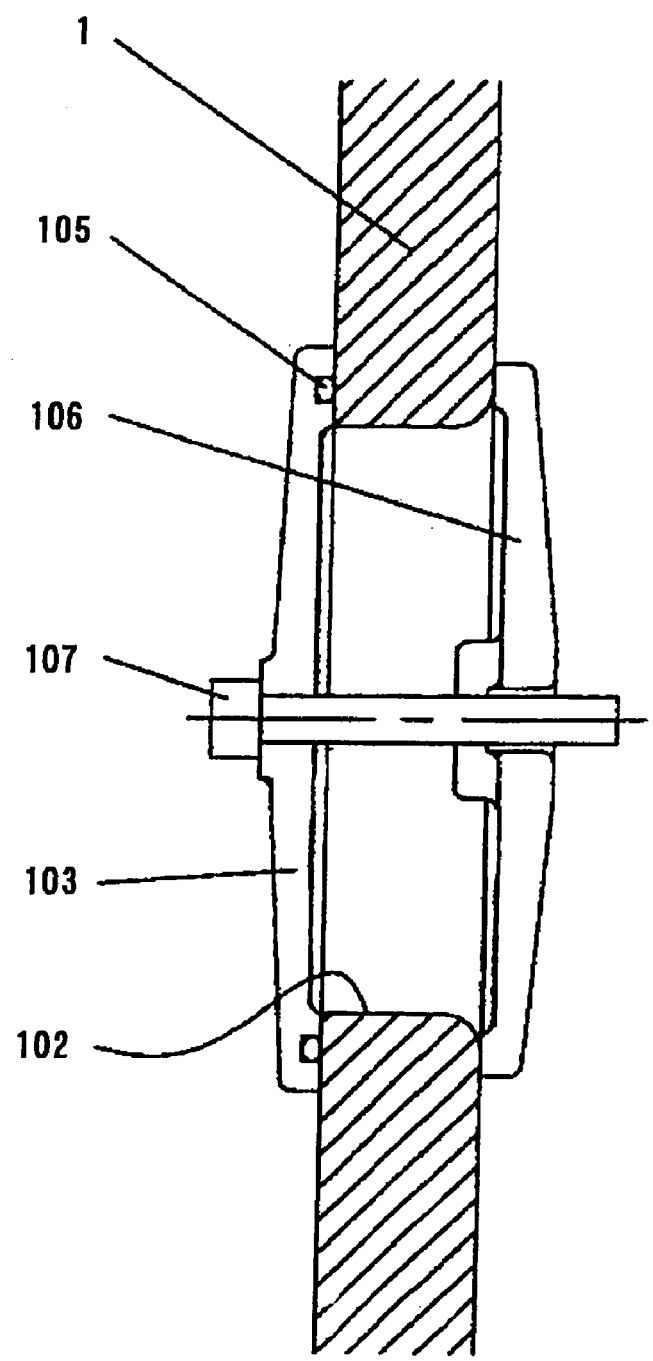
FIG. 9 is an enlarged cross sectional view showing a hole as cast in a side wall of the bed, closed by a cover.

The covers 103 for closing the cast holes 102 formed in the side walls of the bed 1 have a diameter greater than that of the cast holes 102, in order to completely cover the cast holes 102. A hole for allowing passage of a bolt 107, which will be described later, is formed in a central portion of each cover 103. Further, as shown in FIG. 9, an annular groove is formed in a peripheral portion of each cover 103 to extend through the entire circumference, which portion comes into close contact with the bed 1; and an O-ring 105 is fitted into the groove in order to seal the interior of the bed 1. The cover 103 is fixed to the bed by means of a clamper 106 and the bolt 107. Specifically, the clamper 106 has a cruciform shape, and has a threaded hole at the center thereof. The bolt 107 is passed through the cover 103 and is screwed into the threaded hole of the damper 106. When the bolt 107 is fastened or screwed into the threaded hole, the damper 106 comes into close contact with the bed 1. Thus, the cover 103 comes in close contact with the bed 1, and completely covers the cast hole 102, to thereby prevent leakage of air from the interior of the bed 1 and entry of outside air into the interior of the bed 1.

Figure 10:
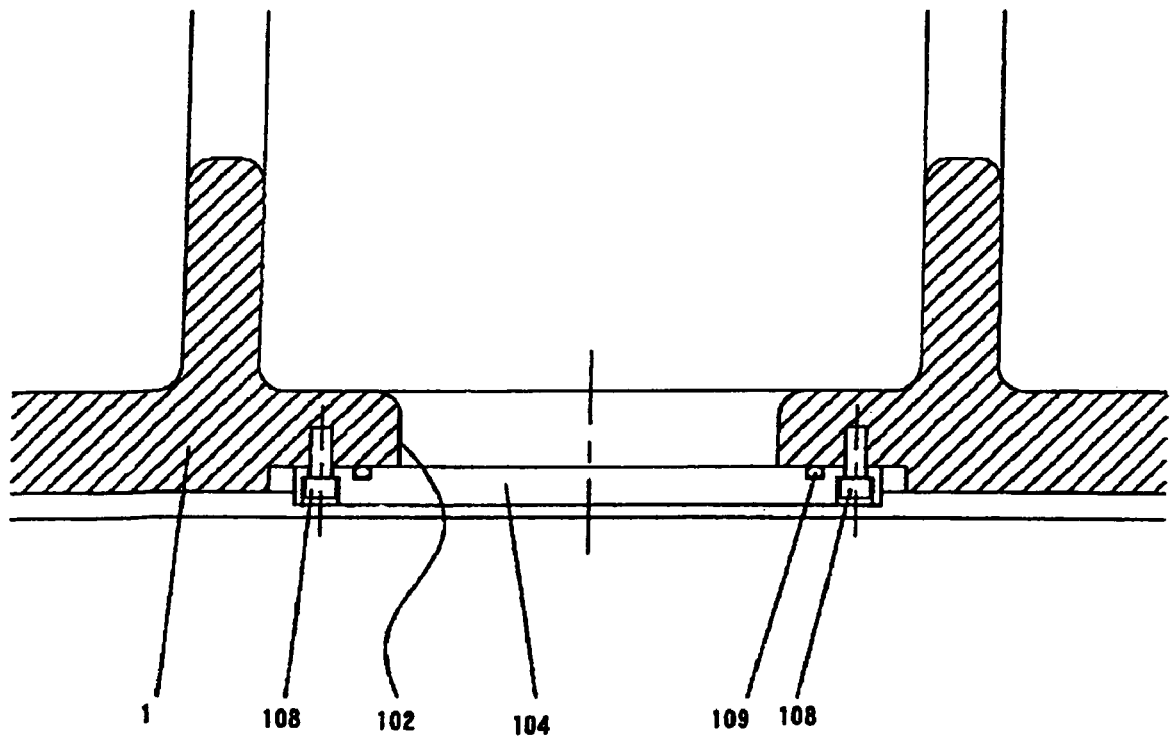
FIG. 10 is an enlarged cross sectional view showing a hole as cast in a bottom wall of the bed, closed by a cover.

Meanwhile, the covers 104 for closing the cast holes 102 formed in the bottom wall of the bed 1 have a diameter greater than that of the cast holes 102, in order to completely cover the cast holes 102. Each cover 104 has a plurality of holes formed in a peripheral portion thereof. Further, as shown in FIG. 10, an annular groove is formed in a peripheral portion of each cover 104 to extend through the entire circumference, which portion comes into close contact with the bed 1: and an O-ring 109 is fitted into the groove. Bolts 108 are passed through the holes of the cover 104 and then screwed into unillustrated threaded portions of holes formed in the bed 1 around the corresponding cast hole 102. When the bolts 108 are fastened or screwed into the threaded portions, the cover 104 comes into close contact with the bed 1, and completely covers the cast hole 102, to thereby prevent leakage of air from the interior of the bed 1 and entry of outside air into the interior of the bed 1.

As described above, since the cast holes 102 formed in the side wall and the bottom wall of the bed 1 are closed by means of the covers 103 and 104, the interior of the bed 1 becomes a closed space, and thus, the area of the surface exposed to the outside air decreases, whereby the thermal displacement of the entire bed 1 can be suppressed. As a result, accuracy during long-time machining can be stabilized. Notably, reference numeral 112 denotes liquid charging openings to be used in a second embodiment. The liquid charging openings 112 are unnecessary in the first embodiment, and are closed by means of plugs.

Next, the second embodiment will be described. In the second embodiment, the cast holes 102 of the bed 1 are closed by use of covers, and a liquid is charged into the interior of the bed 1. Notably, the bed 1 according to the second embodiment is identical in structure with the bed 1 according to the first embodiment. The process of fabricating the bed 1 is identical with the process employed in the first embodiment up to the point where the cast holes 102 are closed by use of the covers 103 and 104. Subsequently, a liquid is charged into the closed interior of the bed 1. Since the O-rings 105 and 109 are fitted to the covers 103 and 104, respectively, the liquid does not leak through portions where the covers 103 and 104 are in close contact with the bed 1.

The liquid to be charged into the interior of the bed 1 is injected from the liquid charge openings 112 provided in the top wall of the bed 1. In general, plugs are fitted into the liquid charge openings 112 in order to prevent entry of outside air. The plugs are removed from the liquid charge openings 112 before injection of the liquid. After completion of injection of the liquid, the plugs are again fitted to the liquid charge openings 112 in order to prevent entry of outside air and evaporation of the liquid, which results in a reduction in the amount of the liquid.

Water, by virtue of its large specific heat, is most preferably used as the liquid charged into the interior of the bed 1. Moreover, a rust preventing agent is preferably added to water in order to avoid rusting of the bed 1 made of cast iron. Furthermore, ethylene glycol serving as an antifreezing fluid may be added to water so as to prevent freezing of the water. Instead of water, oil may be charged into the interior of the bed 1, thereby providing rust prevention and antifreeze protection.

As described above, the cast holes 102 of the bed 1 are closed by means of the covers 103 and 104 so that the interior of the bed 1 becomes a closed space; and a liquid is charged into the interior of the bed 1. Therefore, the thermal capacity of the entire bed increases, and thermal displacement of the entire bed can be suppressed to a greater extent as compared with a bed whose cast holes are closed by means of covers, but whose interior is not filled with liquid.

FIG. 11 shows a table which shows the relation among volume V, surface area S, ratio S/V, weight, and total heat capacity of modeled conventional bed structures and molded bed structures of the present invention. The table of FIG. 11 shows data for six bed structures; i.e., a cast-iron bed A having a cubic solid structure (1 m×1 m×1 m); a cast-iron bed B having a cubic hollow structure (1 m×1 m×1 m) whose interior is divided by ribs (thickness; 50 mm) into 27 chambers arranged in a matrix of 3 (longitudinal direction)×3 (transverse direction)×3 (height direction); a granite bed C having a cubic solid structure (1 m×1 m×1 m); a bed Bo identical with the hollow, rib-reinforced, cast-iron bed B, except that cast holes are closed by means of covers; a bed B1 identical with the bed Bo whose cast holes are closed by means of covers, except that mineral oil is charged into the interior of the bed; and a bed B2 identical with the bed Bo whose cast holes are closed by means of covers, except that water is charged into the interior of the bed.

First, the cast-iron bed A having a solid structure has advantageous features, such as small surface area and large heat capacity. However, as described above, the cast-iron bed A having a solid structure is not preferable, from the viewpoint of weight and influence of distortion caused by long-term changes. Therefore, a conventional cast-iron bed is fabricated to have a hollow, reinforced structure, as the bed B, to thereby remove about 70% of the cast iron. When the hollow, cast-iron bed B is compared with the granite bed C having a solid structure, the granite bed C has a larger heat capacity and a smaller ratio (S/V) of surface area S to volume V. Therefore, the granite bed C can be said to be a structure which Is less likely to follow changes in the outside air temperature.

However, in the case of the bed Bo identical with the hollow, rib-reinforced, cast-iron bed B, except that cast holes are closed by means of covers, since the area of a surface in contact with the outside air decreases by virtue of closure of the cast holes by covers, as compared with the bed B the bed Bo has a reduced ratio S/V, and is less likely to follow changes in the outside air temperature. Moreover, in the case of the bed B1 identical with the bed Bo whose cast holes are closed by means of covers, except that mineral oil is charged into the interior of the bed, a heat capacity almost the same as that of the granite bed C is obtained: and in the case of the bed B2 filled with water, a heat capacity two times that of the granite bed C is obtained. Therefore, these beds B1 and B2 are much less likely to follow changes in the outside air temperature, or are unresponsive to changes in the outside air temperature.

Figure 12:
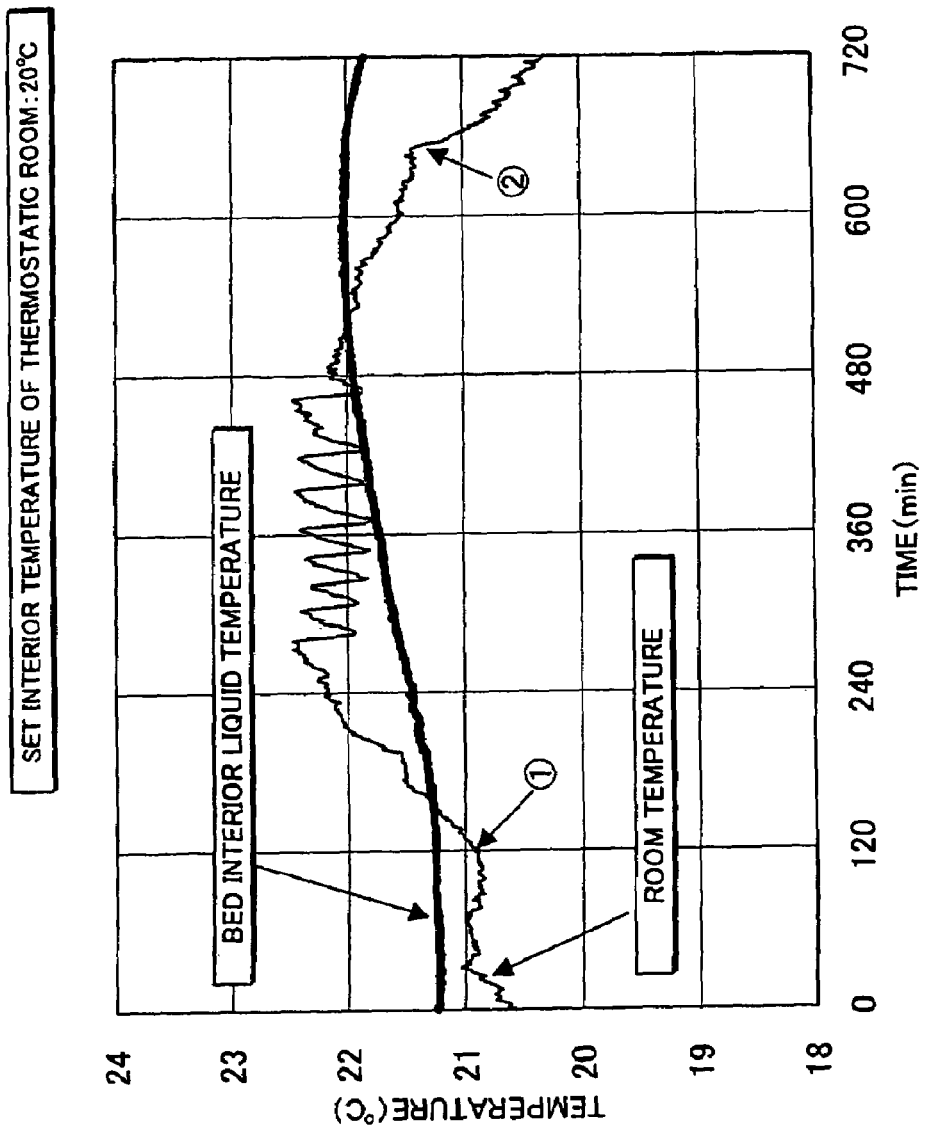
FIG. 12 is a graph showing the results of measurement of the interior temperature (room temperature) of a thermostatic room and the interior temperature of the bed of the machine tool in a state in which the cast holes in the side walls and bottom wall of the bed are closed by means of covers.

FIG. 12 is a graph showing the results of measurement of the interior temperature (room temperature) of a thermostatic room and the interior temperature of the bed 1 according to the first embodiment in which the cast holes 102 in the side walls and bottom wall of the bed 1 are closed by means of the covers 103 and 104. The interior temperature of the thermostatic room is set to 20° C. The interior temperature of the thermostatic room and the interior temperature of the bed were measured by use of platinum thermometer resistors. Measurement of the interior temperature of the bed was performed by use of a platinum thermometer resistor inserted into the liquid charging opening 112 of the bed 1. As can be seen from FIG. 12, when the machine tool is started ($\hat{1}$ in FIG. 12), the interior temperature of the thermostatic room increases, because of heat generation of the machine tool, and fluctuates because of disturbances such as entry of a person into the thermostatic room and departure of the person therefrom. When the machine tool is stopped ($\hat{2}$ in FIG. 12), the interior temperature of the thermostatic room decreases to the vicinity of the set temperature, because no heat is generated from the machine tool.

The interior temperature of the bed also increases when the machine tool is started. However, the interior temperature of the bed does not coincide with the interior temperature of the thermostatic room, and slowly increases with the interior temperature of the thermostatic room. Further, the graph demonstrates that the interior temperature of the bed is hardly influenced by changes in the interior temperature of the thermostatic room.

In other words, since the interior of the bed 1 is completely closed by closing the cast holes 102 in the side walls and bottom wall of the bed 1 by means of the covers 103 and 104, the interior temperature of the bed 1 becomes less likely to follow changes in the interior temperature of the thermostatic room; i.e., becomes comparatively unresponsive to changes in the interior temperature of the thermostatic room. As a result, although the outside surfaces of the bed 1 receive the influence of changes in the interior temperature of the thermostatic room, the inside surfaces of the bed 1 hardly receive the influence of changes in the interior temperature of the thermostatic room. Therefore, the area of a surface of the bed which undergoes changes in the outside air temperature decreases, and the thermal displacement of the entire bed can be suppressed.

Figure 13:
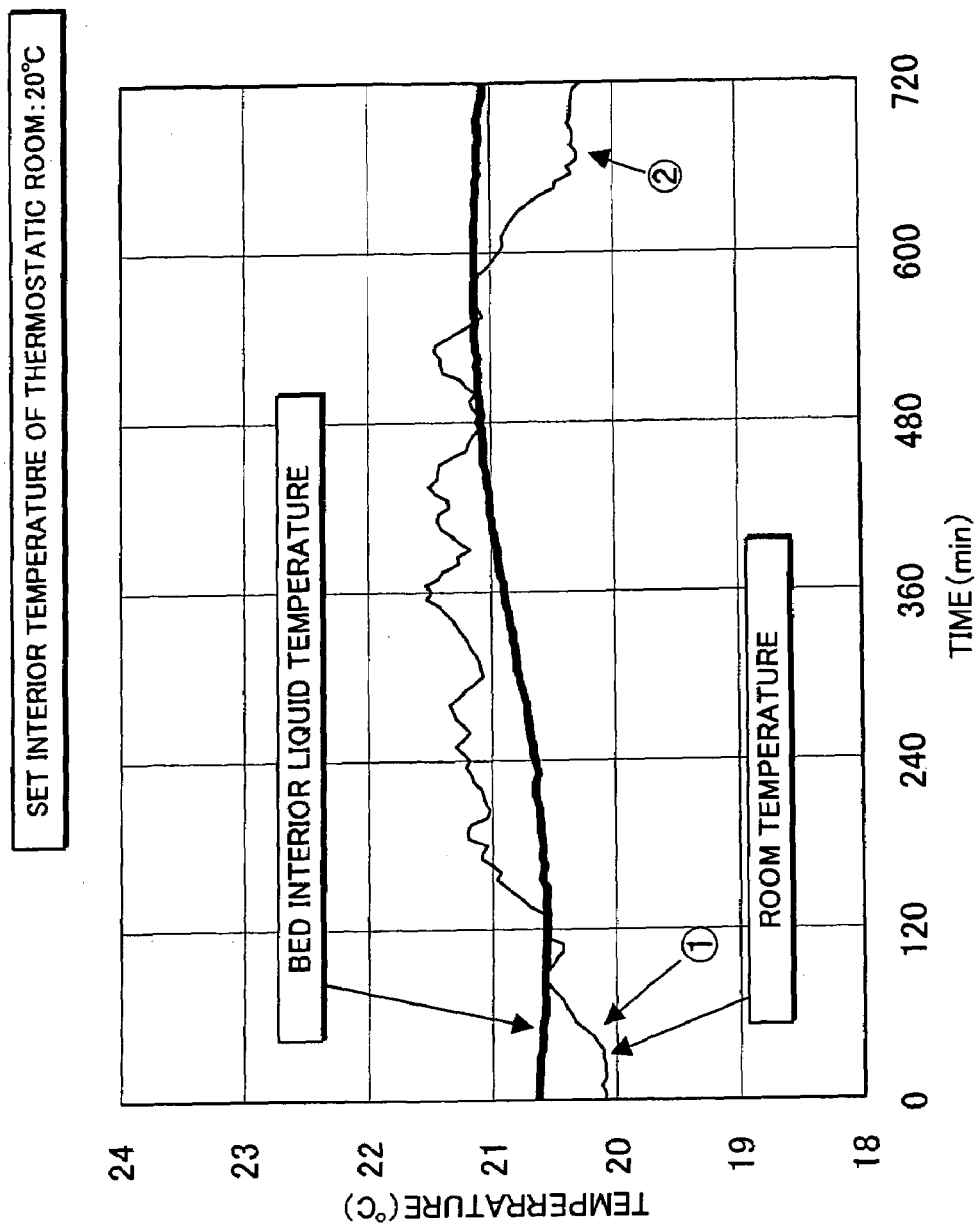
FIG. 13 is a graph showing the results of measurement of the interior temperature (room temperature) of a thermostatic room and the liquid temperature of the bed of the machine tool in a state in which the cast holes in the side walls and bottom wall of the bed are closed by means of covers, and the interior of the bed is filled with liquid.
Figure 14:
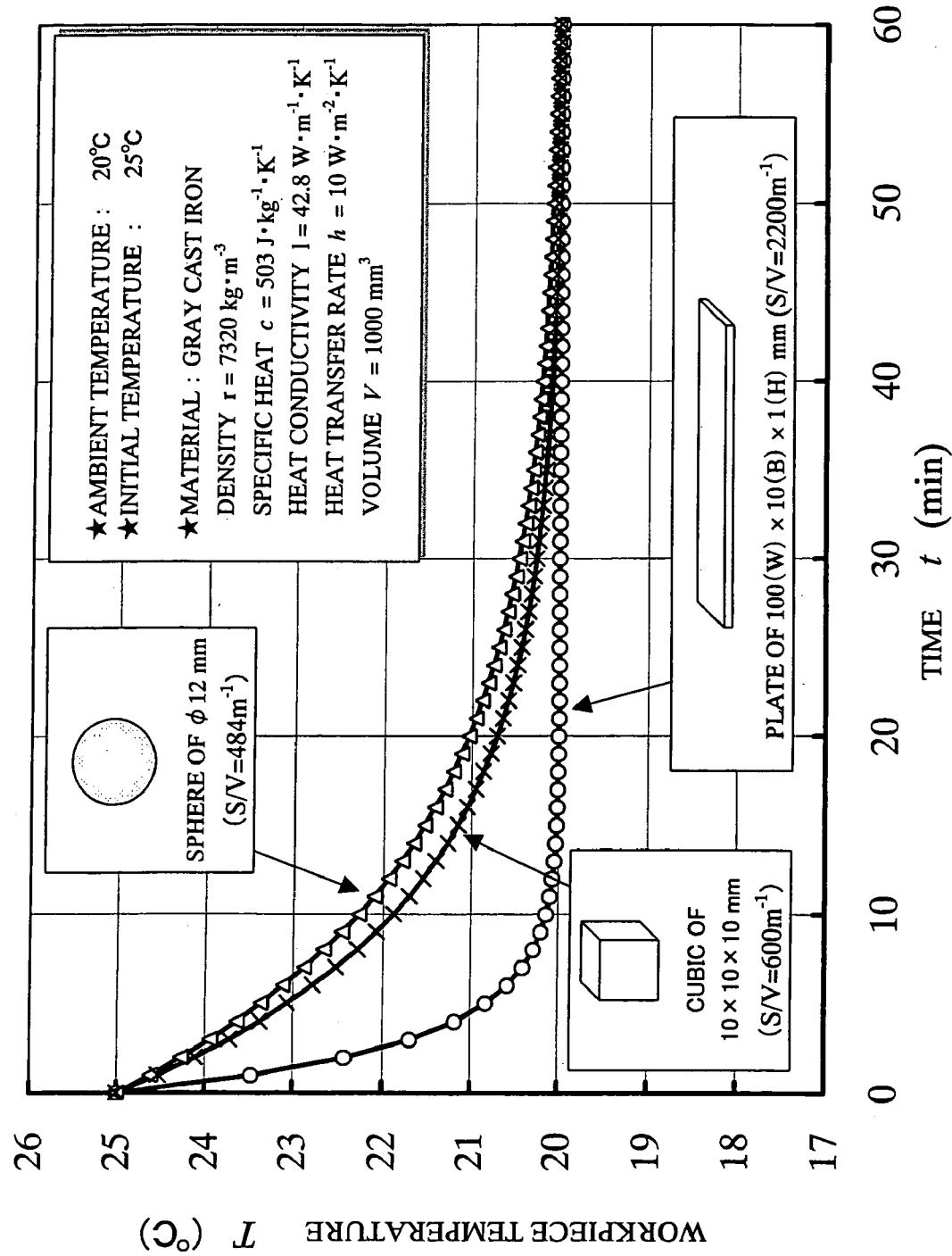
FIG. 14 is a graph showing results of calculation for obtaining temperature changes of three objects which have the same volume and the same temperature difference with respect to outside air temperature, but have different surface areas.

FIG. 13 is a graph showing the results of measurement of the interior temperature (room temperature) of a thermostatic room and the liquid temperature of the bed 1 according to the second embodiment in which a liquid is charged into the interior of the bed 1. The interior temperature of the thermostatic room is set to 20° C. Water containing a rust preventing agent was used as the liquid charged into the interior of the bed 1. The interior temperature of the thermostatic room and the liquid temperature were measured by use of platinum thermometer resistors. Measurement of the liquid temperature was performed by use of a platinum thermometer resistor inserted into the liquid charging opening 112 of the bed 1. As can be seen from FIG. 13, as in the case shown in FIG. 12, when the machine tool is started (①̂ in FIG. 13), the interior temperature of the thermostatic room increases because of heat generation of the machine tool, and fluctuates because of disturbances such as entry of a person into the thermostatic room and departure of the person therefrom. When the machine tool is stopped (②̂ in FIG. 13), the interior temperature of the thermostatic room decreases to the vicinity of the set temperature, because no heat is generated from the machine tool.

The liquid temperature also increases when the machine tool is started. However, the liquid temperature does not coincide with the interior temperature of the thermostatic room, and slowly increases with the interior temperature of the thermostatic room. Further, the graph demonstrates that the liquid temperature is hardly influenced by changes in the interior temperature of the thermostatic room.

When the bed 1 according to the second embodiment is compare with the bed 1 according to the first embodiment in which the cast holes 102 in the side walls and bottom wall of the bed 1 are closed by means of the covers 103 and 104, but no liquid is charged into the interior of the bed 1, the internal temperature of the bed 1 according to the second embodiment filled with liquid becomes much less likely to follow changes in the interior temperature of the thermostatic room; i.e., becomes comparatively unresponsive to changes in the interior temperature of the thermostatic room. In other words, since the total heat capacity of the bed increases by virtue of water containing a rust-preventing-agent and charged into the interior of the bed 1, the bed 1 according to the second embodiment can be said to become much less likely to follow changes in the interior temperature of the thermostatic room, or to become comparatively unresponsive to changes in the interior temperature of the thermostatic room, as compared with the case where the cast holes of the bed are merely closed by means of covers. As a result, the thermal displacement of the entire bed can be suppressed to a greater extent, as compared with the case where the cast holes of the bed are merely closed by means of covers.

Obviously, numerous modifications and variations of the present invention are possible in light of the above teachings. It is therefore to be understood that within the scope of the appended claims, the present invention may be practiced otherwise than as specifically described herein.

What is claimed is:

1. A machine tool, comprising:
an X-axis moving unit, a Y-axis moving unit, and a Z-axis moving unit for producing relative movements between a tool and a workpiece along the respective directions of an X-axis, a substantially vertical Y-axis, and a Z-axis, which differ from one another;
a C-axis drive unit for rotating the workpiece about a C-axis parallel to the Z-axis; and
a B-axis turning unit for turning the tool about a B-axis which is defined on the B-axis turning unit and is parallel to the Y-axis, wherein
the tool is disposed in such a manner that a machining point of the tool substantially coincides with the B-axis, and
the moving units, the drive unit, and the turning unit are controlled in such a manner that a work point of the workpiece substantially coincides with the machining point of the tool.

2. A machine tool according to claim 1, wherein the B-axis turning unit is disposed on the Y-axis moving unit in such a manner that the B-axis substantially coincides with a center axis of a movable member of the Y-axis moving unit, the center axis extending along the Y-axis direction; and the tool is disposed on the B-axis turning unit.

3. A machine tool comprising:
an X-axis moving unit, a Y-axis moving unit, and a Z-axis moving unit for producing relative movements between a tool and a workpiece along the respective directions of an X-axis, a Y-axis, and a Z-axis, which differ from one another;
a C-axis drive unit for rotating the workpiece about a C-axis parallel to the Z-axis; and
a B-axis turning unit for turning the tool about a B-axis which is defined on the B-axis turning unit and is parallel to the Y-axis, wherein
the tool is disposed in such a manner that a machining point of the tool substantially coincides with the B-axis, and
the moving units, the drive unit, and the turning unit are controlled in such a manner that a work point of the workpiece substantially coincides with the machining point of the tool,
wherein the B-axis turning unit is disposed on the Y-axis moving unit in such a manner that the B-axis substantially coincides with a center axis of a movable member of the Y-axis moving unit, the center axis extending along the Y-axis direction, and the tool is disposed on the B-axis turning unit,
wherein the C-axis drive is disposed on the Z-axis moving unit in such a manner that the C-axis substantially coincides with a center axis of a movable member of the Z-axis moving unit, the center axis extending along the Z-axis direction.

4. A machine tool comprising:
an X-axis moving unit, a Y-axis moving unit, and a Z-axis moving unit for producing relative movements between a tool and a workpiece along the respective directions of an X-axis, a Y-axis, and a Z-axis, which differ from one another;

a C-axis drive unit for rotating the workpiece about a C-axis parallel to the Z-axis; and a B-axis turning unit for turning the tool about a B-axis which is defined on the B-axis turning unit and is parallel to the Y-axis, wherein the tool is disposed in such a manner that a machining point of the tool substantially coincides with the B-axis, and the moving units, the drive unit, and the turning unit are controlled in such a manner that a work point of the workpiece substantially coincides with the machining point of the tool, wherein the machine tool has a bed having a horizontal top surface and a vertical side surface, wherein the X-axis moving unit is disposed on the horizontal top surface of the bed, the Z-axis moving unit is disposed on the X-axis moving unit, and the C-axis drive unit is disposed on the Z-axis moving unit, and wherein the Y-axis moving unit is disposed on the vertical side surface of the bed in such a manner that a Z-axis-direction center axis of the movable member of the Z-axis moving unit perpendicularly intersects a Y-axis-direction center axis of the movable member of the Y-axis moving unit, the B-axis turning unit is disposed on the Y-axis moving unit, and the tool is disposed on the B-axis turning unit.

5. A machine tool according to claim 4, wherein the bed is formed through casting and has a hollow structure and a hole as cast; and a cover is provided to cover the hole as cast in order to close the interior of the bed.

6. A machine tool according to claim 5, wherein a liquid is charged into the interior of the bed.

7. A machine tool according to claim 6, wherein the liquid is oil, or water containing a rust preventing agent.

* * * * *